United States Patent
Alsaadi

(10) Patent No.: US 10,586,093 B2
(45) Date of Patent: Mar. 10, 2020

(54) SYSTEM, DEVICE, AND METHOD FOR PATTERN REPRESENTATION AND RECOGNITION

(71) Applicant: King Abdulaziz University, Jeddah (SA)

(72) Inventor: Fawaz Eid Alsaadi, Jeddah (SA)

(73) Assignee: King Abdulaziz University, Jeddah (SA)

(*) Notice: Subject to any disclaimer, the term of this patent is extended or adjusted under 35 U.S.C. 154(b) by 51 days.

(21) Appl. No.: 15/822,645

(22) Filed: Nov. 27, 2017

(65) Prior Publication Data

US 2018/0285622 A1     Oct. 4, 2018

Related U.S. Application Data

(60) Provisional application No. 62/478,450, filed on Mar. 29, 2017.

(51) Int. Cl.
*G06K 9/00* (2006.01)

(52) U.S. Cl.
CPC ....... *G06K 9/00093* (2013.01); *G06K 9/0008* (2013.01); *G06K 9/00073* (2013.01); *G06K 2009/00953* (2013.01)

(58) Field of Classification Search
None
See application file for complete search history.

(56) References Cited

U.S. PATENT DOCUMENTS

| | | | |
|---|---|---|---|
| 2002/0168093 A1 | 11/2002 | Sanders et al. | |
| 2004/0125993 A1* | 7/2004 | Zhao ................ | G06K 9/00006 382/124 |
| 2006/0104484 A1* | 5/2006 | Bolle ................ | G06K 9/00073 382/115 |
| 2006/0159316 A1 | 7/2006 | Chisamore et al. | |
| 2008/0273770 A1 | 11/2008 | Kohout | |
| 2015/0039899 A1* | 2/2015 | Bringer ................ | H04L 9/3093 713/186 |
| 2017/0076132 A1* | 3/2017 | Sezan ................ | G06K 9/00013 |

FOREIGN PATENT DOCUMENTS

EP       0 062 066 B1    1/1988

* cited by examiner

*Primary Examiner* — David Perlman
(74) *Attorney, Agent, or Firm* — Oblon, McClelland, Maier & Neustadt, L.L.P.

(57) ABSTRACT

A system and methodologies for pattern representation and recognition are provided. A method includes acquiring a representation associated with discriminating information associated with a subject, retrieving an association between a stored representation and an identity of the subject, determining a discrimination score as a function of the representation and the stored representation based on a neighbor similarity score and relationship contextualization process parameters, and executing one or more control actions based on the discrimination score.

4 Claims, 16 Drawing Sheets

Ridge
 Valley
 Ridge Ending
 Ridge Bifurcation

SYSTEM, DEVICE, AND METHOD FOR PATTERN REPRESENTATION AND RECOGNITION

CROSS-REFERENCE TO RELATED APPLICATIONS

This application claims the benefit of priority from U.S. Provisional Application No. 62/478,450 filed Mar. 29, 2017, the entire contents of which are incorporated herein by reference.

BACKGROUND

There is a growing interest in enhancing the security of authentication systems using credentials based on biometric features. Biometric features are singular, meaning that each individual has only one of any given biometric feature. Once the number of authentication applications outstrips the number of biometric features an individual possess, an unavoidable overlap in usage occurs based on the pigeonhole principle. Without overcoming the singular nature of biometric features, a biometrically-enhanced authentication system provides an opportunity and incentive for the permanent compromise of the underlying biometric feature information for authentication purposes.

In one example, an authentication system may use fingerprint biometric. Many fingerprint representation and matching approaches have been devised. These approaches must address the challenge of overcoming inter-user similarities and intra-user variations due to their significant, detrimental impact on authentication performance.

At a low (or local) level, variations between fingerprint samples can include nonlinear distortion between minutiae and detection of spurious minutiae (1102 and 1104 in FIG. 11), which can affect the establishment of relationships between pairs of minutiae. As the security provided by the authentication system heavily depends upon discriminating the relationships between pairs of minutiae, the consistent selection of pairs is critical. Selecting too many pairs can result in the overshadowing of germane fingerprint details, leading to coincidental mismatches of details between fingerprint samples originating from the same or different fingers. Selecting too few pairs can result in the omission of germane fingerprint details, rendering the discrimination process impotent. Therefore, pairs of minutiae between which to establish relationships are selected carefully and consistently. Many approaches exist for selecting pairs of minutiae with the goal of consistently selecting the same pairs of minutiae across fingerprint samples originating from the same finger. Unlike the approach described herein, these existing approaches tend to have fatal flaws stemming from their uses of inflexible structures, difficult parameters, and arbitrary decisions.

FIG. 1A is a schematic that shows neighbor selection using a fixed-radius approach. The fixed-radius approach pairs each minutia with all minutiae surrounding it within a fixed radius. Although unaffected by the presence of spurious minutiae, the inflexible nature of the fixed radius results in sporadic pairing of minutiae in the presence of nonlinear distortion (as shown in FIG. 1A). Additionally, the effective determination of the radius can be difficult. Schematic 102 shows omission of correct neighbor due to relative distortion, schematic 104 shows the original neighborhood, and schematic 106 shows omission of correct neighbor due to spurious minutia.

FIG. 1B is a schematic that shows neighbor selection using a k-nearest neighbors approach. The k-nearest neighbor approach pairs each minutia with the k-nearest minutiae where k is a fixed value. The inflexible, competitive nature of the approach results in sporadic pairing of minutiae in the presence of nonlinear distortion or spurious minutiae (as shown in FIG. 1B). Additionally, the effective determination of k can be difficult. Schematic 108 shows omission of correct neighbor due to relative distortion, schematic 110 shows the original neighborhood, and schematic 112 shows omission of correct neighbor due to spurious minutia.

FIG. 1C is a schematic that shows neighbor selection using a fixed sectors approach. The fixed sectors approach pairs each minutia with the closest minutia from each of S fixed sectors in a round-robin style until it has been paired with k minutiae where S and k are fixed values. The inflexible nature of the fixed sectors and the inflexible, competitive nature of the approach results in sporadic pairing of minutiae in the presence of nonlinear distortion or spurious minutiae as shown in FIG. 1C. Additionally, the effective determination of S and k can be difficult. Schematic 114 shows omission of correct neighbor due to relative distortion, schematic 116 shows the original neighborhood, and schematic 118 shows omission of correct neighbor due to spurious minutia.

FIG. 1D is a schematic that shows neighbor selection using a Voronoi-diagram approach. The Voronoi-diagram approach pairs each minutia with those minutiae with which it shares a border in a Voronoi diagram. The volatile and competitive nature of the approach results in sporadic pairing of minutiae in the presence of nonlinear distortion or spurious minutiae as shown in FIG. 1D. A benefit of the approach is that it does not necessitate the effective determination of any fixed values. Schematic 120 shows omission of correct neighbor due to relative distortion, schematic 122 shows the original neighborhood, and schematic 124 shows omission of correct neighbor due to spurious minutia.

As described previously herein, known approaches to pairing minutiae suffer from conceptual flaws. Accordingly, what is needed, as recognized by the present inventor, is a method and system capable of consistently selecting the same pairs of minutiae across fingerprint samples originating from the same finger, resulting in the authentication system providing greater security through definitive discernment of fingerprint samples originating from different fingers and, conversely, definitive association of fingerprint samples originating from the same finger.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method and system for pattern representation and recognition. The method includes acquiring a representation associated with discriminating information associated with a subject, retrieving an association between a stored representation and an identity of the subject, determining a discrimination score as a function of the representation and the stored representation based on a neighbor similarity score and relationship contextualization process parameters, and executing one or more control actions based on the discrimination score.

The methodologies described herein are able to consistently select the same pairs of minutiae across fingerprint samples originating from the same finger, resulting in the authentication system providing greater security through definitive discernment of fingerprint samples originating from different fingers and, conversely, definitive association of fingerprint samples originating from the same finger.

The foregoing paragraph has been provided by way of general introduction, and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
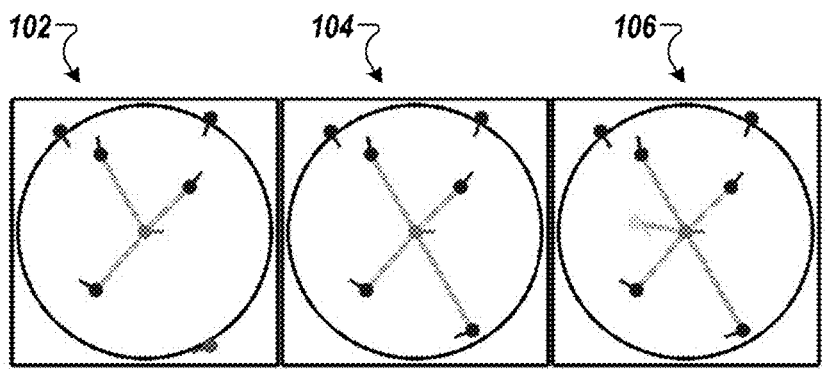
FIGS. 1A-1D are schematics that show neighbor selection using a plurality of methods according to one example.
Figure 1B:
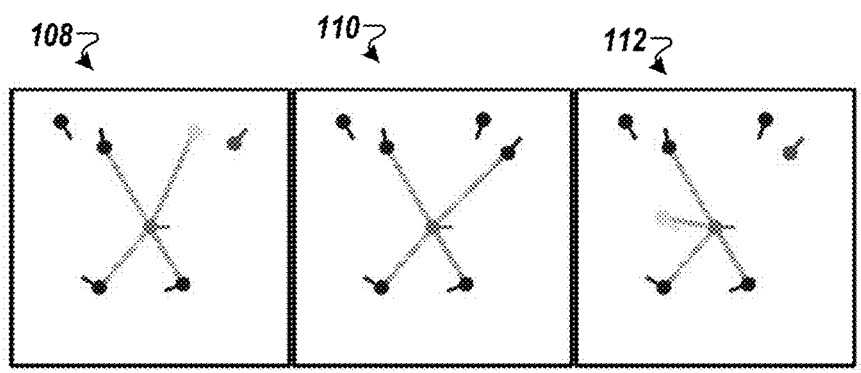
Figure 1C:
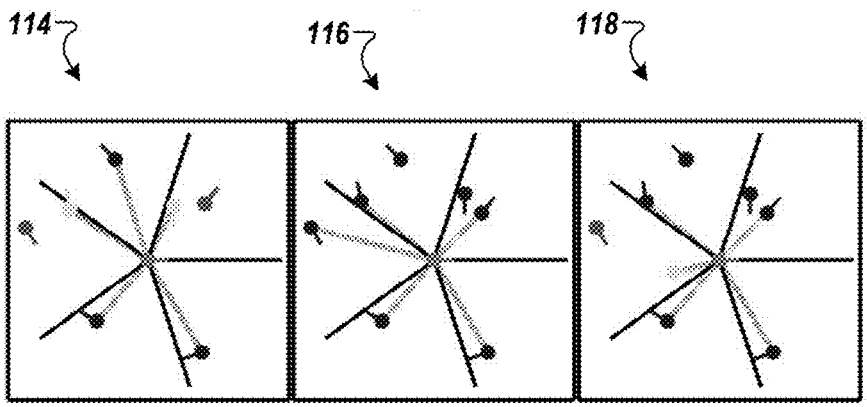
Figure 1D:
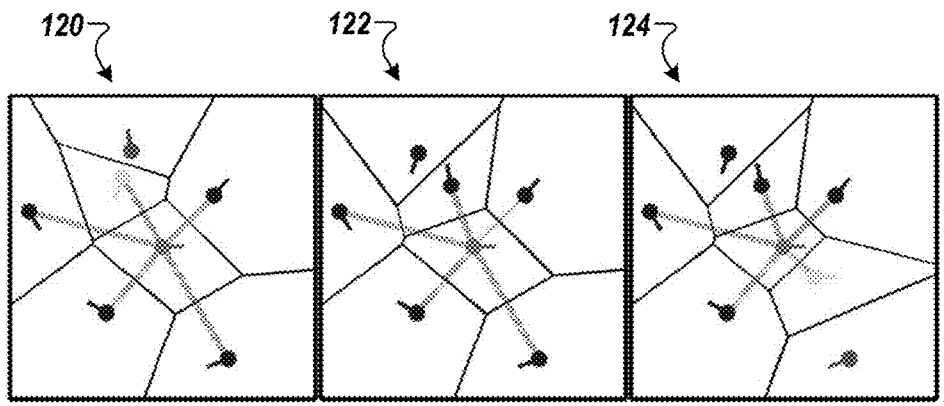

Referring now to the drawings, wherein like reference numerals designate identical or corresponding parts throughout several views, the following description relates to a pattern representation and recognition system and associated methodology utilizing and embodying consistent and contextualized discriminating information representation and hierarchical discrimination.

Figure 8:
FIG. 8 is a schematic that shows fingerprint friction ridges according to one example.

In one implementation, the pattern representation and recognition system may be an authentication system in which the discriminating information may include biometric features such as a fingerprint. A fingerprint is fundamentally an impression left by the friction ridges of a human finger that consists of ridges and valleys. An exemplary fingerprint is shown in FIG. 8. Representations of fingerprints may be the locations and directions of ridge endings and ridge bifurcations, which are collectively known as minutiae. At a high (or global) level, variations between fingerprint samples can include apparent rotation and translation of entire fingerprints relative to a fixed origin and fixed polar axis that form the frame of reference for determining the locations and directions of minutiae.

In one implementation, the authentication system is configured to overcome both variations (e.g., rotation and translation of a fingerprint) that occur between fingerprint samples originating from the same finger and addressing the singular nature of fingerprints.

An authentication system may issue different credentials to ensure uniqueness of the credentials between deployments and recovery from compromise. Each human finger may produce a single discriminable fingerprint. In order to use fingerprints in the authentication system, the fingerprint may be contextualized. In other words, authentication credentials associated with a fingerprint from a particular finger in a first context vary and cannot be associated with authentication credentials produced from the same finger for a second context. Further, the authentication credentials vary and may not be associated with authentication credentials produced from another finger in any context.

The primary objectives of fingerprint contextualization are: 1) stabilizing representations of germane fingerprint details by reducing variations between representations of fingerprint samples originating from the same finger and 2) varying these representations based on controllable, external information (e.g., encryption keys, passwords, other biometric information). These seemingly-contradictory goals are rooted in control. Variations between fingerprint samples are inherently uncontrollable while information used to vary representations is controllable. Some approaches to contextualization also add random, unaffiliated information to the representations they produce. This "chaff", being non-specific to any particular context, does not aid in the contextualization process.

The first contextualization objective is often accomplished by some form of normalization or reduction (e.g., binary encoding or hashing), which mitigates the effects on representations of variations between fingerprint samples originating from the same finger as described herein. This has the unfortunate effect of omitting germane fingerprint information, resulting in oversimplified representations that prove inadequate for proper discrimination and therefore do not enable the authentication system to provide adequate security. The second contextualization objective is accomplished utilizing encryption with the controllable, external information being context-specific encryption keys. As fingerprint samples from a single finger vary, representations capturing enough germane fingerprint information still possess some degree of variance between samples originating from the same finger. The application of standard encryption methods to even slightly-varied fingerprint information renders the information unintelligible to mathematical manipulation and therefore debilitates the discrimination process.

Some approaches combine fingerprint information with select external information rather than generated information (e.g., an encryption key, password, or other independent information). The select external information may be more readily obtainable or guessable than generated information and inherently limited in quantity. As it is not desirable to limit the number of contexts (e.g., deployment or time periods) of an authentication system or unnecessarily risk the compromise of authentication credentials, approaches that contextualize fingerprints based on select information are flawed.

Figure 4:
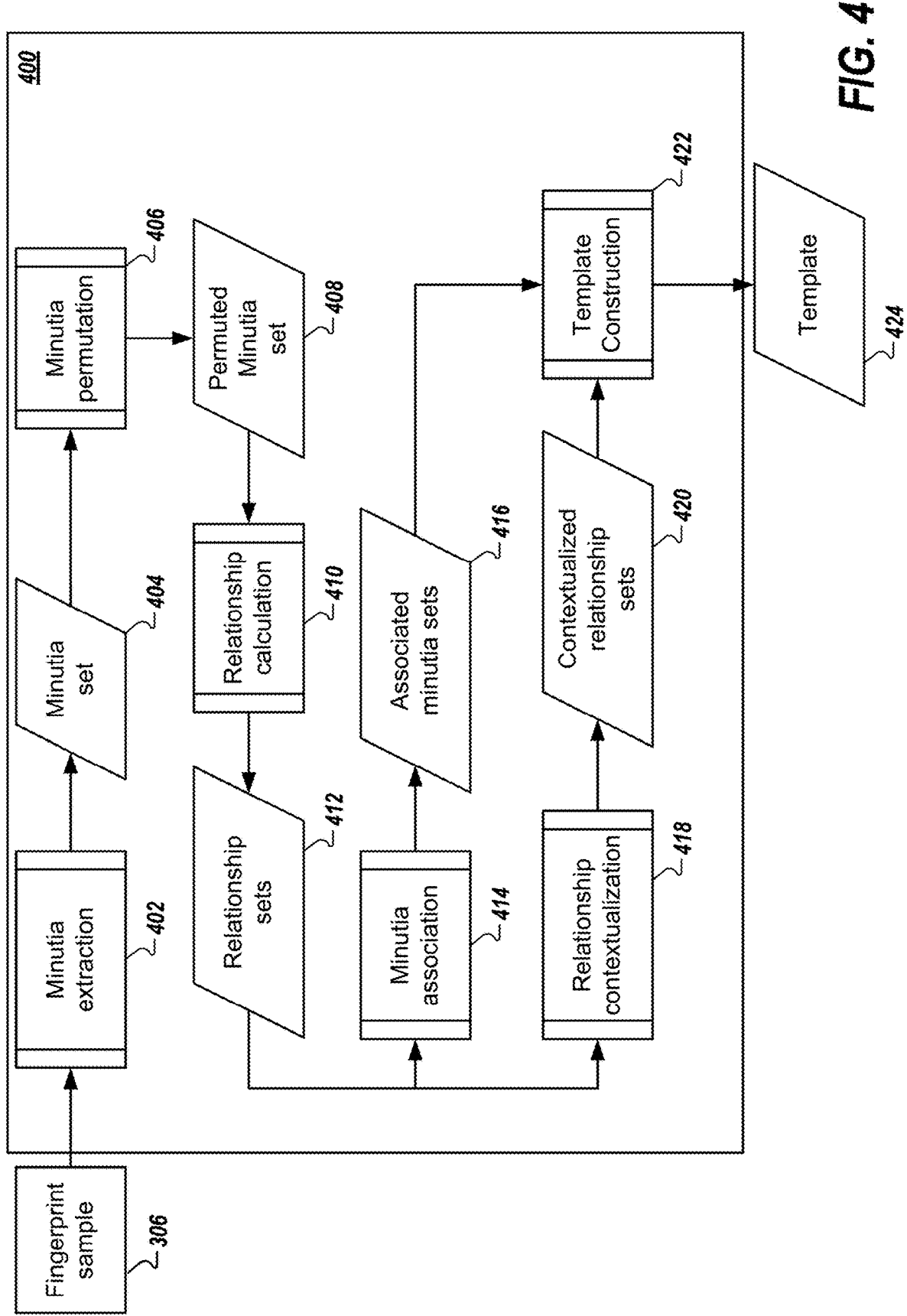
FIG. 4 is a flow diagram of an example system operational flow for template generation according to one example.
Figure 7:
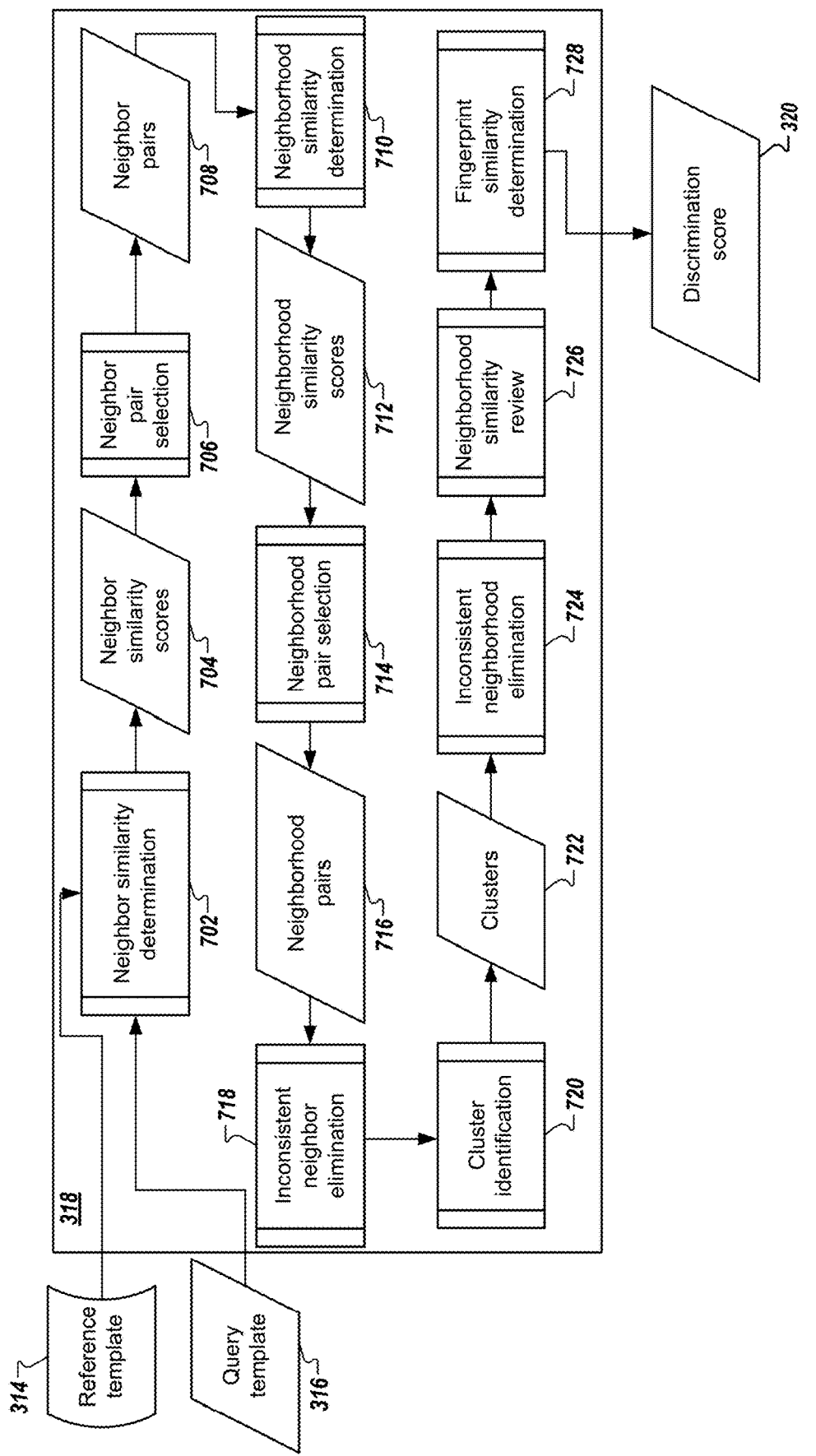
FIG. 7 is a flow diagram of an example system operational flow for template discrimination according to one example.

While known approaches to fingerprint contextualization suffer from conceptual flaws, the contextualization methodologies described herein, which are implemented in step 418 of FIG. 4 and step 702 of FIG. 7, are able to apply random permutations or almost any standard encryption to fingerprint information in such a way that the majority of germane fingerprint details are retained. A first aspect is accomplished by encoding and then encrypting or mapping to a random permutation all reasonable variations of fingerprint information in a limited scope as described further below. A second aspect, which produces a more compact representation, is accomplished by encoding and then encrypting or mapping to a random permutation the quotient of each germane fingerprint detail and two variations of this quotient, based on dividing by an applicable threshold pertinent to the discrimination process as described further below. Thus, the security of the authentication system is upheld even with contextualization applied.

In one implementation, the authentication system is configured to verify the transference of local fingerprint information to global fingerprint information (e.g., a special pattern of ridge and valleys). As the fingerprint is represented by relationships between pairs of minutiac, the overall level of difference (or similarity) of two fingerprints from localized relationships may be reduced. While some existing approaches to the discrimination of fingerprint representations attempt to discriminate at a global level by aligning fingerprint details according to salient, global details (e.g., fingerprint core or fingerprint deltas), these approaches suffer when proper detection of global details is disrupted (e.g., incomplete fingerprint samples, unclean fingerprint samples, or distortion). Using normalized or reduced representations for discrimination omits germane fingerprint details resulting in an impotent discrimination process. Utilizing relationships between pairs of minutiae does not adequately deduce high-level fingerprint differences (or similarities) from local discriminations.

The frequency of coincidental matching directly coincides with the amount of germane fingerprint information used to make discriminations. For this reason, an effective approach determines whether conclusions drawn on discriminations utilizing smaller quantities of information are in fact valid by taking into account larger quantities of information. The discrimination of representations is accomplished by performing hierarchical advancements in discrimination and deduction combined with reevaluations of previous deductions. Thereby, the resulting discrimination score is based only on associated fingerprint information that meets established tolerances, providing a firm foothold in terms of security when making discernments of whether fingerprint samples originated from the same or different fingers.

Figure 2:
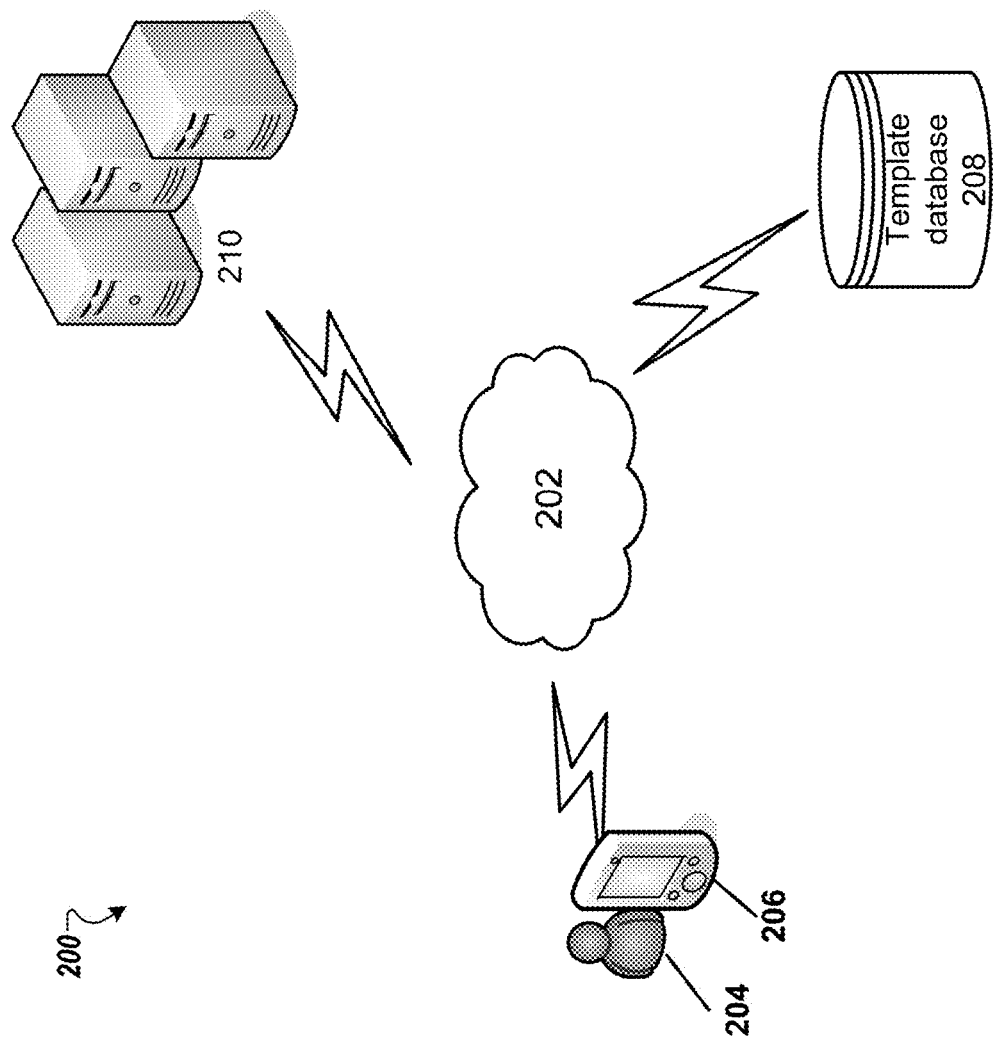
FIG. 2 is an exemplary diagram of an example environment for an authentication system.

FIG. 2 is an exemplary diagram of an example environment 200 of the authentication system. A user 204 may enroll in the system by providing biometric data (e.g., fingerprint, iris, finger vein ID, facial recognition, and the like) using an electronic device 206. The electronic device 206 may generate a reference template using the methodologies described herein. Then, the electronic device 206 may output the reference template to a server 210 via network 202. The server 210 stores an association between the reference template and an identity of the user 204 in a template database 208. The template database 208 may correspond to a memory of the server 210. In other implementations, the template database 208 may be a cloud-based database. The electronic device 206 may include a fingerprint sensor to capture a fingerprint of the user 204. In one implementation, the electronic device 206 may include a camera to capture other biometric features such as a face of the user 204.

The network 202 is any network that allows the server 210 and the electronic device 206 to communicate information with each other. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

In one implementation, the authentication system may be implemented as an identification system.

The authentication system generates representations of fingerprints that are relatively unaffected by variations between fingerprint samples originating from the same finger, contextualizes those representations such that representations intended for different contexts (e.g., deployments or time periods) vary definitively and cannot be readily associated, and discriminates those representations to provide a discrimination score that can be used to definitively discern fingerprint samples originating from different fingers (and, conversely, definitively associate fingerprint samples originating from the same finger).

Figure 3:
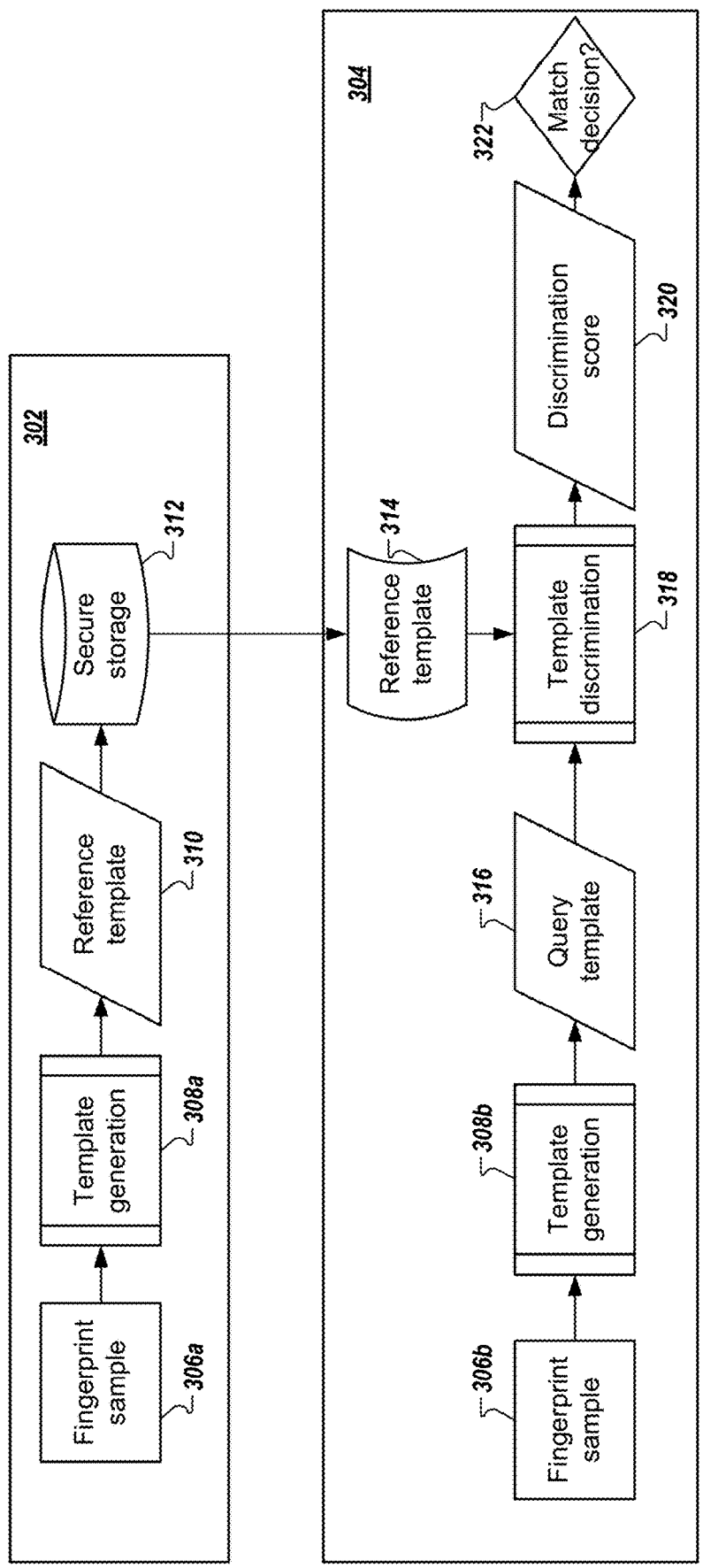
FIG. 3 is a flow diagram of an example system operational flow for authentication according to one example.

FIG. 3 is a flow diagram of an example system operational flow for authentication according to one example. The authentication system and its underlying subprocesses are described using fingerprints as, or as part of, the authentication credentials. Other information may be used additionally or alternatively to the fingerprints. In addition, the methodologies described herein may be applied to sensor network, cell phone networks, and the like.

The authentication system depicted in FIG. 3 includes an enrollment subprocess 302 and an authentication subprocess 304. The enrollment subprocess 302 is for providing to an authenticator, such as the server 210, information such as a reference template 314 to authenticate credentials such as a query template 316 provided during the authentication subprocess 304. The enrollment subprocess 302 and the authentication subprocess 304 process utilize a fingerprint sample 306a, 306b acquired as described previously herein when the enrollment subprocess 302 or the authentication subprocess 304 are executed. For example, at the beginning of the enrollment process 302 the fingerprint may be acquired using fingerprint detection circuitry associated with the user device 206. The circuitry may be any circuitry, sensor or device that may provide a suitable representation of finger-friction-ridges, referred to herein as a fingerprint sample 306. An exemplary fingerprint sample is shown in FIG. 8. The enrollment subprocess 302 and the authentication subprocess 304 may pass the fingerprint samples 306a, 306b to a template generation subprocess 308. An exemplary template generation subprocess 308 is shown in FIG. 4.

The template generation subprocess 308 in the enrollment subprocess 302 generates a reference template 310, which is presented to the authenticator or an agent of the authenticator. The reference template 310 is stored in association with the identity of the user 204 from whom the fingerprint sample 306a originated in a secure storage 312 (e.g., the template database 208, a cloud based database) for later retrieval at step 314 during the authentication subprocess 304. The identity of the user 204 may be in the form of a username, email address, identification code, or the like.

The template generation step 308b in the authentication subprocess 304 generates a query template 316, which is presented to the authenticator along with an appropriate claim of identity. The authenticator retrieves the reference template 314 associated with the claimed identity from the secure storage 312 then passes the reference template 314 and the query template 316 to a template discrimination subprocess 318. An exemplary template discrimination subprocess 318 is shown and described in FIG. 7.

The template discrimination subprocess 318 produces/outputs a discrimination score 320, which is utilized by the authenticator to render a match decision 322. The match decision 322 may be obtained by comparing the discrimination score 320 to a predetermined security threshold (e.g., 95%, 98%, 99%). If the discrimination score 320 is less than the predetermined security threshold, the authentication attempt is considered to have failed. In response to determining that the authentication attempt has failed, the authenticator may take one or more control actions per the context of the authentication system. For example, the authenticator may delete a template associated with the failed attempt when the number of failed attempts exceeds a predetermined number. Otherwise, the authentication attempt is considered to have succeeded with the authenticator taking appropriate action per the context of the authentication system.

Although the flow diagrams show specific orders of executing functional logic blocks, the order of executing the blocks may be changed relative to the order shown, as will be understood by one of ordinary skill in the art. Also, two or more blocks shown in succession may be executed concurrently or with partial concurrence.

Figure 9:
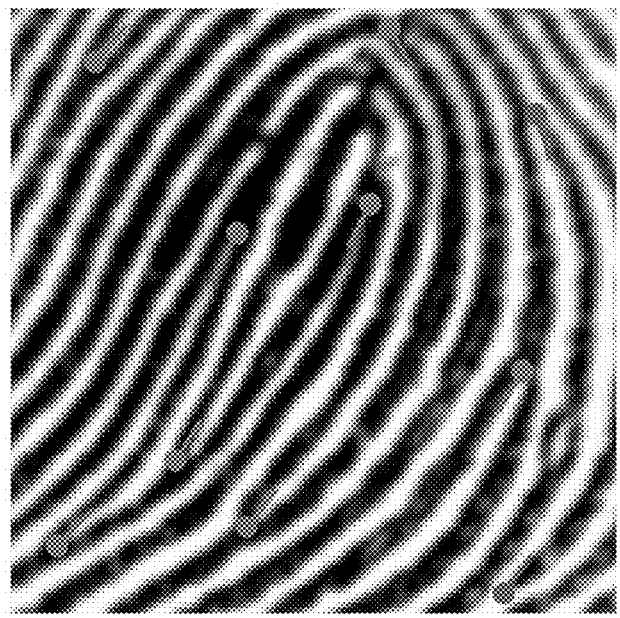
FIG. 9 is a schematic that shows fingerprint ridge endings and ridge bifurcations according to one example.
Figure 9:
Figure 9:
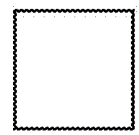
Figure 9:
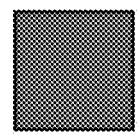
Figure 9:
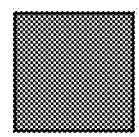
Figure 10:
FIG. 10 is a schematic that shows fingerprint minutiae according to one example.
Figure 11:
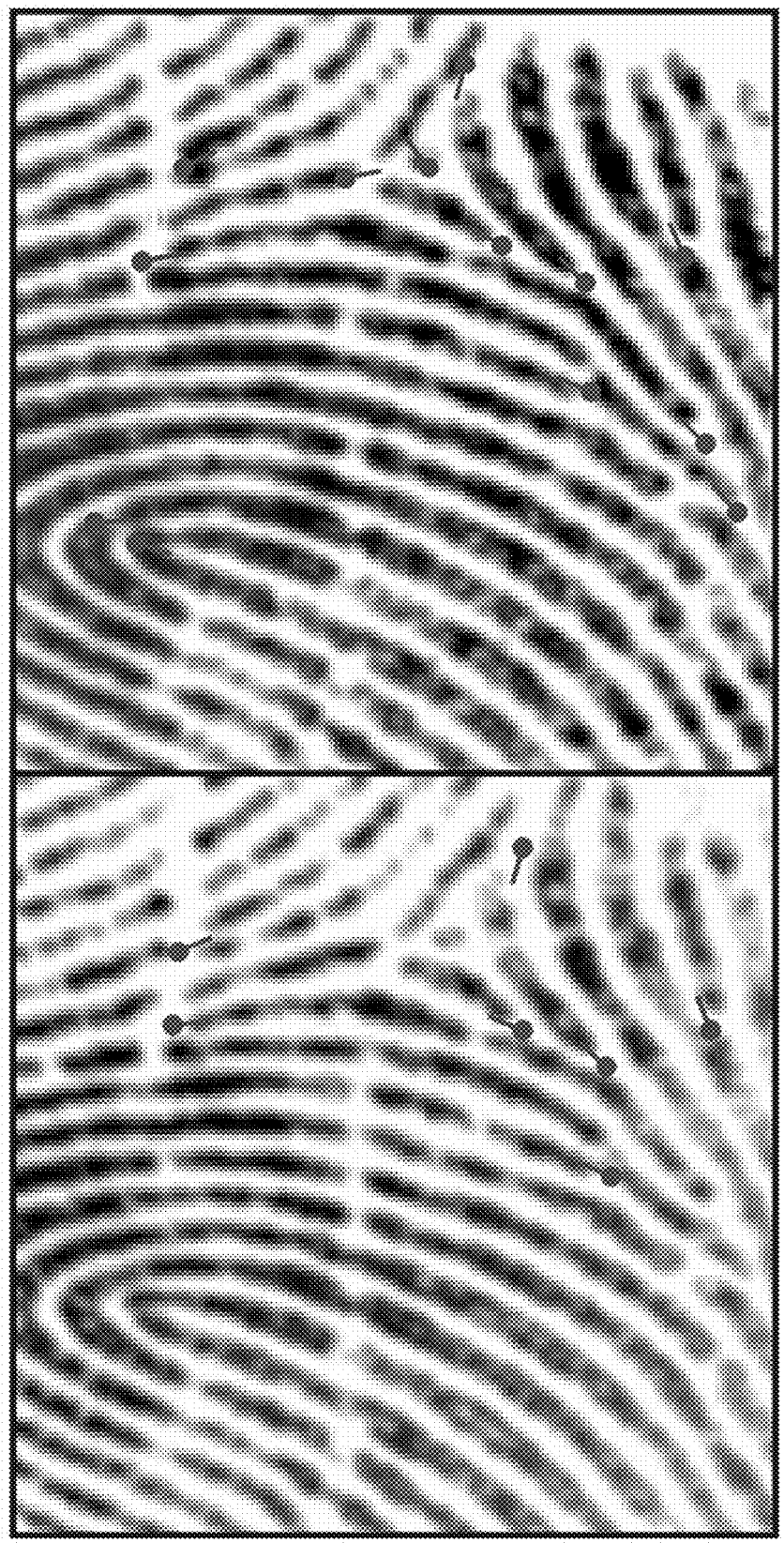
FIG. 11 is a schematic that shows nonlinear distortion of minutiae and detection of spurious minutiae between two fingerprint samples according to one example.

FIG. 4 is an exemplary flow diagram of a template generation subprocess 400, which is an implementation of steps 308a and 308b of the enrollment subprocess 302 and the authentication subprocess 304, respectively and is performed by the user device 204. The fingerprint sample 306 is passed to the minutia extraction process 402. The minutia extraction process 402 may determine Cartesian coordinates x and y (i.e., measured relative to a fixed origin) and azimuth θ (i.e., measured in degrees relative to a fixed polar axis) of each ridge ending and ridge bifurcation in the fingerprint sample 306. Exemplary ridge endings and ridge bifurcations are shown in FIG. 9. Both ridge endings and ridge bifurcations are herein simply referred to as minutiae as shown in FIG. 10. The minutia extraction process 402 outputs a minutia set 404 that includes an (x, y, θ) triplet for each minutia extracted from the fingerprint sample 306.

The minutia set 404 is passed to the minutia permutation process 406. The minutia permutation process 406 may randomly permutes the order of the (x, y, θ) triplets in the minutia set 404 to enhance the security of the authentication system by thwarting efforts of artifice that depend upon gleaning information from the order of the (x, y, θ) triplets in the minutia set 406. In one implementation, the minutia permutation process 406 may be skipped. The minutia permutation process 408 generates a permuted minutia set 408 that consists of the same (x, y, θ) triplets as the minutia set 404 in a randomly-permuted order. If the minutia permutation process 406 is forgone, the permuted minutia set 408 is the same as the minutia set 404.

Figure 12:
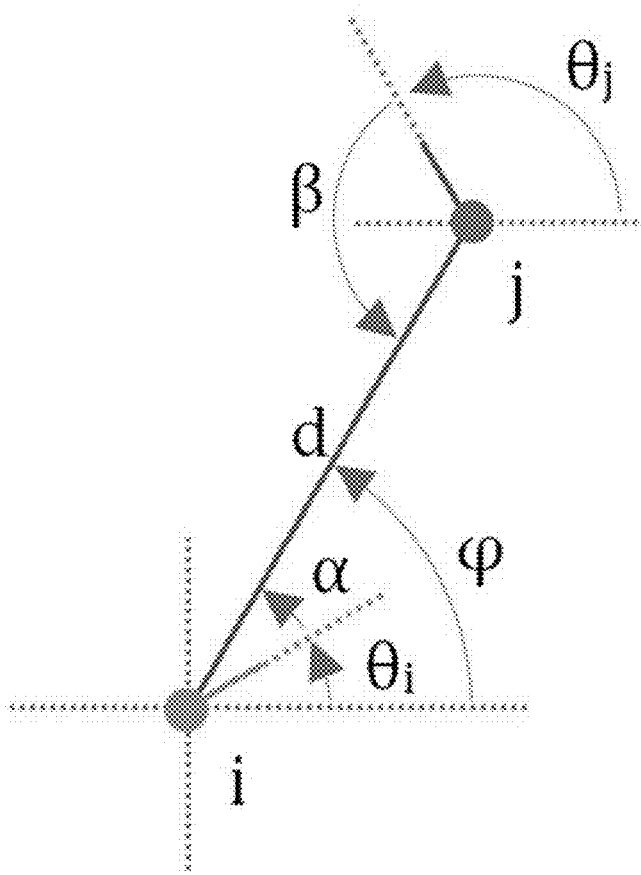
FIG. 12 is a schematic that shows relationships between a pair of minutiae according to one example.

The permuted minutia set 408 is passed to the relationship calculation process 410, which calculates relationships (d, α, β) between pairs of (x, y, θ) triplets in the permuted minutia set 408 (as shown and described in FIG. 12). The relationship calculation process 410 generates relationship sets 412 that include relationships (d, α, β) for every possible pair of (x, y, θ) triplets in the permuted minutia set 408. For a pair of (x, y, θ) triplets (i and j), the calculation of its (d, α, β) triplet may be expressed as:

$$d = \sqrt{(x_j - x_i)^2 + (y_j - y_i)^2} \quad (1)$$

$$\alpha = (\varphi - \theta_i) \bmod 360$$

$$\text{where } 0 \le \varphi = \tan^{-1}\left(\frac{y_j - y_i}{x_j - x_i}\right) < 360 \text{ degrees}$$

$$\beta = (\varphi + 180 - \theta_j) \bmod 360$$

The relationship sets 412 are passed to the minutia association process 414 which associates with each minutia a set of minutiae using only the d values contained within the (d, α, β) triplets and a predetermined factor. Each (x, y, θ) triplet in the permuted minutia set 408 can be considered to be a representation of a minutia and therefore each (d, α, θ) triplet in the relationship sets 412 can be considered to be a set of relationships for a pair of minutiae. The minutia association process 414 produces associated minutia sets 416 including a set of associated minutiae for each minutia. The selection of minutiae for each set is performed as follows:

A minutia j is included in the set associated with minutia i if for a predetermined factor F≥1 at least one of the following two conditions is satisfied for every other minutia k where $d_{ab}$ represents the relationship d for minutiae a and b:

$$\frac{d_{ij}}{F} \le d_{ik} \text{ or } \frac{d_{ji}}{F} \le d_{jk} \quad (2)$$

A spurious minutia (k) in the middle of a fingerprint is likely to be located relatively near a true minutia (i or j). Thus, $d_{ij} \approx d_{ij}$ or $d_{jk} \ne d_{ji}$. Equation (2) mitigates the effect of spurious minutiae as F causes at least one of $$\frac{d_{ij}}{F} \le d_{ij} \text{ or } \frac{d_{ji}}{F} \le d_{ji}$$

to hold. When the distance in (2) are relatively distorted to a reasonable degree, F causes at least one of the two conditions to hold, thereby showing that equation (2) mitigates the effect of relative distortion using the method described herein.

The relationship sets 412 are also passed to the relationship contextualization process 418, which contextualize the (d, α, θ) triplets in the relationship sets 412 such that contextualized relationship sets 420 for two fingerprint samples 306 originating from the same finger cannot be associated in the template discrimination subprocess 318 if the contextualized relationship sets 420 are intended for different contexts, such as different authentication systems or periods of time. This allows the same finger to be utilized within many different contexts with minimal risk of spreading compromise across contexts. This is implemented by a neighbor similarity determination subprocess 702 of FIG. 7, producing low or zero neighbor similarity scores 704 when the context varies as described later herein. Obviously, contextualized relationship sets 420 for two fingerprint samples 306 originating from different fingers should not be able to be associated in the template discrimination subprocess 318, regardless of the intended context. The relationship contextualization subprocess 418, which is optional if only a single operational context is necessary, produces contextualized relationship sets 420 including contextualized relationships in lieu of (d, α, β) triplets. If the relationship contextualization subprocess 418 is forgone, the contextualized relationship sets 420 are the same as the relationship sets 412. Otherwise, the contextualization, which varies based on whether a template 424 is to be a reference template 310 or a query template 316, is performed as described below with reference to FIG. 5.

For each set of relationships (d, α, β) in the relationship sets 412 between a pair of minutiae (i and j), where ($d_{ij}$, $a_{ij}$, $β_{ij}$) represents the relationships (d, α, β) between i and j, process 500 may be executed. Process 500 may be implemented by processing circuitry of the electronic device 206.

Figure 5:
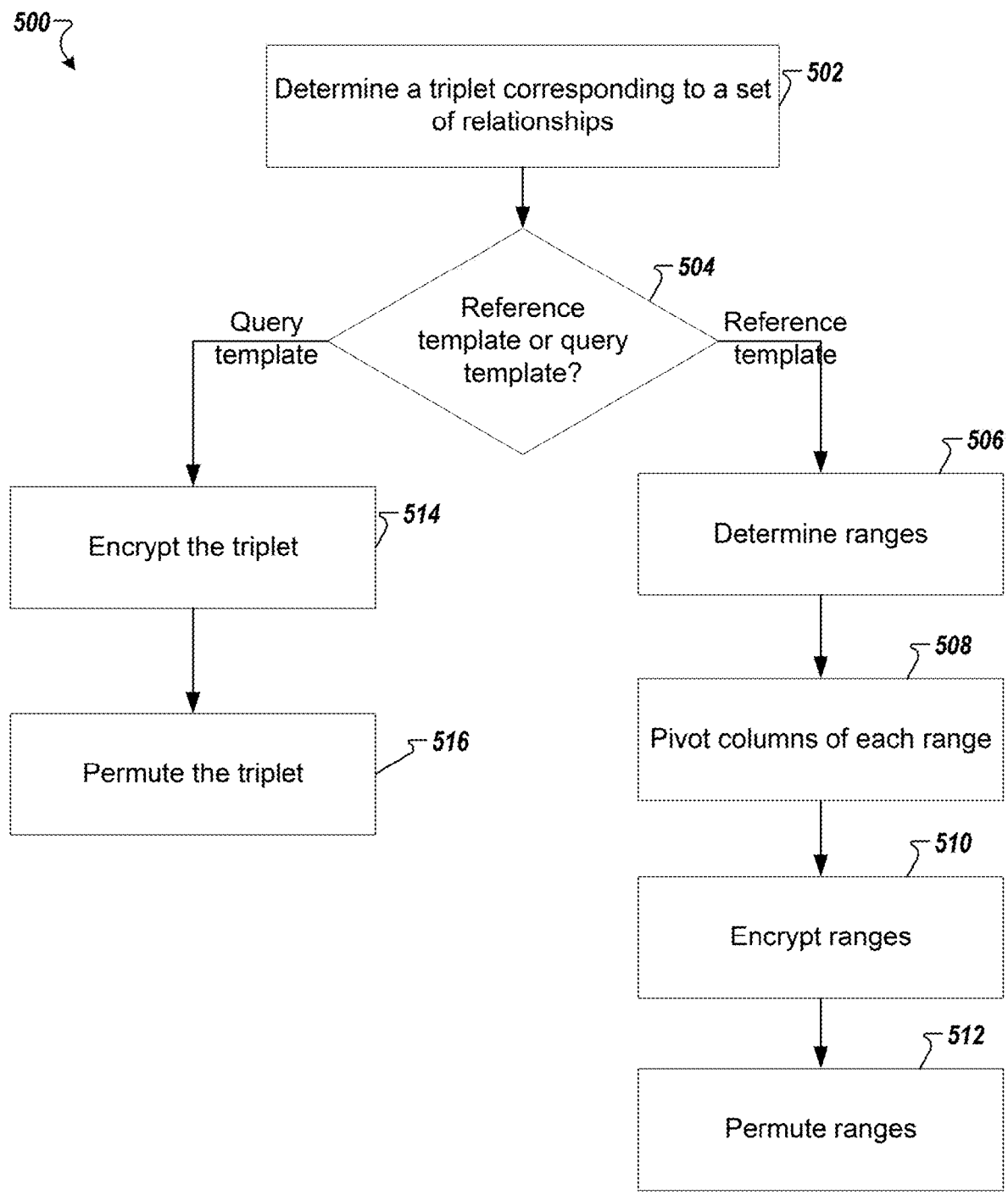
FIG. 5 is a flowchart that shows a method for a contextualization process according to one example.

FIG. 5 is a flowchart of a method 500 for a contextualization process. At step 502, a (x, y, β) triplet from the (d, α, β) triplet may be determined as:

$$x = \text{round}(d_{ij} \cos(α_{ij})) + S_x$$

$$y = \text{round}(d_{ij} \sin(α_{ij})) + S_y$$

$$β = (\text{round}(β_{ij}) + S_β) \bmod 360 \quad (3)$$

where $S_x$, $S_y$, and $S_β$ are predetermined integral values for shift that are specific to the current finger and context.

If the template 414 is to be a reference template 310, the process proceeds to step 506.

At step 506, ranges (X, Y, B) are determined, for example, using:

$$X = (x + [-T_s \ldots -2 -1\ 0 +1 +2 \ldots +T_s])$$

$$Y = (y + [-T_s \ldots -2 -1\ 0 +1 +2 \ldots +T_s])$$

$$B = (β + [-T_β \ldots -2 -1\ 0 +1 +2 \ldots +T_β]) \bmod 360 \quad (4)$$

where $T_s$ and $T_β$ are predetermined integral value for threshold that are the same for every finger and context.

At step 508, the columns of each range are independently and randomly pivoted about the center column, for example using:

$$X = (x + [-T_s \ldots +2 -1\ 0 +1 -2 \ldots +T_s])$$

$$Y = (y + [-T_s \ldots -2 -1\ 0 +1 +2 \ldots -T_s])$$

$$B = (β + [-T_β \ldots +2 -1\ 0 +1 -2 \ldots +T_β]) \bmod 360 \quad (4)$$

If the use of encryption is desired, encrypted ranges (EX, EY, EB) are determined by encrypting each value in each range:

$$EX = \text{Encrypt}(X, k_x)$$

$$EY = \text{Encrypt}(Y, k_y)$$

$$EB = \text{Encrypt}(B, k_β) \quad (5)$$

where $k_x$, $k_y$, and $k_β$ are predetermined encryption keys that are specific to the current finger and context. Encrypt (value, key) is any standard encrypting method that takes a plaintext value and a key as parameters. For example, the function may use a symmetric encryption algorithm such as advanced encryption standard (AES) or Rivest Cipher 4 (RC4).

If the use of random permutations is desired, ranges (EX, EY, EB) are determined by mapping each value in each range to a value in a stored random permutation of all of the possible values in the range:

$$EX = \text{Map}(X, P_x)$$

$$EY = \text{Map}(Y, P_y)$$

$$EB = \text{Map}(B, P_β) \quad (6)$$

where $P_x$, $P_y$, and $P_β$ are predetermined random permutations that are specific to the current finger and context.

At step 514, in response to determining that the template 424 is a query template 316, If the use of encryption is desired, encrypted (Ex, Ey, Eβ) triplet may be determined as:

$$Ex = \text{Encrypt}(x, k_x)$$

$$Ey = \text{Encrypt}(y, k_y)$$

$$Eβ = \text{Encrypt}(β, k_β) \quad (7)$$

where $k_x$, $k_y$, and $k_β$ are predetermined encryption keys that are specific to the current finger and context. Encrypt (value, key) is any standard encryption method that takes a plaintext value and a key as parameters.

At step 516, when the use of random permutations is desired, (Ex, Ey, Eβ) triplet are determined by mapping each value to a value in a stored random permutation of all of the possible values for that value:

$$Ex = \text{Map}(x, P_x)$$

$$Ey = \text{Map}(y, P_y)$$

$$EP = \text{Map}(β, P_β) \quad (8)$$

where $P_x$, $P_y$, and $P_β$ are predetermined random permutations that are specific to the current finger and context.

Figure 6:
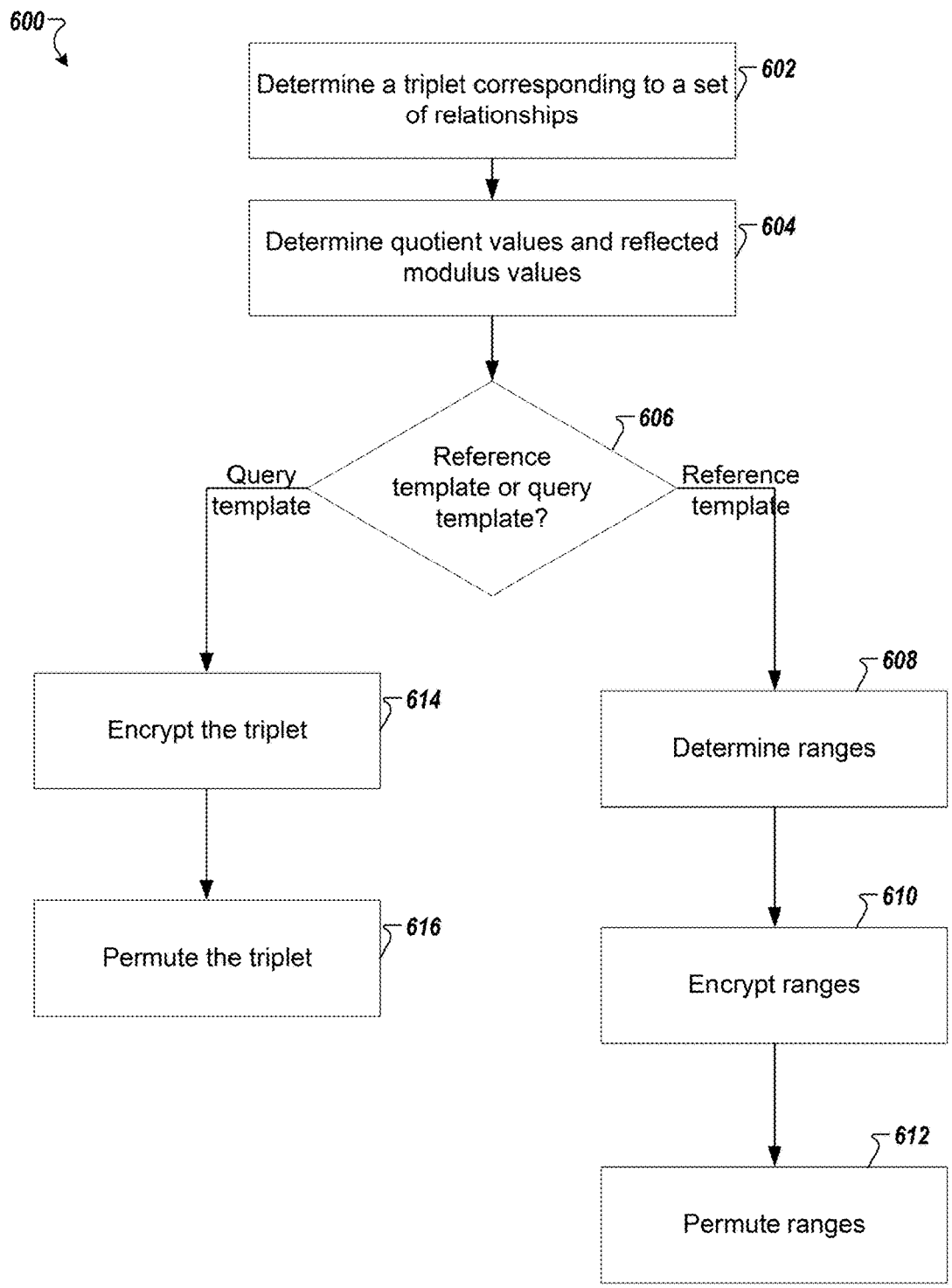
FIG. 6 is a flowchart that shows a method for a contextualization process according to another example.

In another implementation, contextualization process 600 shown in FIG. 6 may be executed at the relationship contextualization subprocess 418 of FIG. 4.

At step 602, a (x, y, β) triplet from the (d, α, β) triplet may be determined using equation (3).

At step 604, quotient values ($q_x$, $q_y$, $q_p$) and reflected modulus values ($r_x$, $r_y$, $r_p$) are determined as follows:

$$q_x = \left\lfloor \frac{x}{T_s} \right\rfloor \quad r_x = (\bmod T_s) + (q_x \bmod 2)(T_s - 2(x \bmod T_s)) \quad (9)$$

$$q_y = \left\lfloor \frac{y}{T_s} \right\rfloor \quad r_y = (\bmod T_s) + (q_y \bmod 2)(T_s - 2(y \bmod T_s))$$

$$q_β = \left\lfloor \frac{β}{T_β} \right\rfloor \quad r_β = (\bmod T_β) + (q_β \bmod 2)(T_β - 2(β \bmod T_β))$$

where $T_s$ and $T_β$ are predetermined integral values for threshold that are the same for every finger and context.

At step 606, a determination is made to whether the template 424 is a query template 316 or a reference template 310. In response to determining that the template 424 is the reference template 310, the process proceeds to step 608. In response to determining that the template 424 is the query template 316, the process proceeds to step 614.

At step 608, ranges ($Q_x$, $Q_y$, $Q_\beta$) are determined:

$$Q_x = \begin{cases} [q_x - 1 \quad q_x \quad q_x + 1], & q_x \text{ even} \\ [q_x + 1 \quad q_x \quad q_x - 1], & q_x \text{ odd} \end{cases} \quad (10)$$

$$Q_y = \begin{cases} [q_y - 1 \quad q_y \quad q_y + 1], & q_y \text{ even} \\ [q_y + 1 \quad q_y \quad q_y - 1], & q_y \text{ odd} \end{cases}$$

$$Q_\beta = \begin{cases} [q_\beta - 1 \quad q_\beta \quad q_\beta + 1] \bmod \dfrac{360}{T_\beta}, & q_\beta \text{ even} \\ [q_\beta + 1 \quad q_\beta \quad q_\beta - 1] \bmod \dfrac{360}{T_\beta}, & q_\beta \text{ odd} \end{cases}$$

At step 610, when the use of encryption is desired (e.g., requested by a user, application, and the like), encrypted ranges ($EQ_x$, $EQ_y$, $EQ_\beta$) are determined by encrypting each value in each range:

$EQ_x = \text{Encrypt}(Q_x, k_x)$ $EQ_y = \text{Encrypt}(Q_y, k_y)$ $EQ_\beta = \text{Encrypt}(Q_\beta, k_\beta)$ \quad (11)

where $k_x$, $k_y$, and $k_\beta$ are predetermined encryption keys that are specific to the current finger and context. Encrypt (value, key) is any standard encryption method that takes a plaintext value and a key as parameters.

At step 612, when the use of random permutations is desired, ranges ($EQ_x$, $EQ_y$, $EQ_\beta$) are determined by mapping each value in each range to a value in a stored random permutation of all of the possible values in the range:

$EQ_x = \text{Map}(Q_x, P_x)$ $EQ_y = \text{Map}(Q_y, P_y)$ $EQ_\beta = \text{Map}(Q_\beta, P_\beta)$ \quad (12)

where $P_x$, $P_y$, and $P_\beta$ are predetermined random permutations that are specific to the current finger and context.

At step 614, when the use of encryption is desired, encrypted ($Eq_x$, $Eq_y$, $Eq_\beta$) triplet is determined as:

$Eq_x = \text{Encrypt}(q_x, k_x)$ $Eq_y = \text{Encrypt}(q_y, k_y)$ $Eq_\beta = \text{Encrypt}(q_\beta, k_\beta)$ \quad (13)

where $k_x$, $k_y$, and $k_\beta$ are predetermined encryption keys that are specific to the current finger and context. Encrypt (value, key) is any standard encryption method that takes a plaintext value and a key as parameters.

At step 616, If the use of random permutations is desired, determine ($Eq_x$, $Eq_y$, $Eq_\beta$) triplet by mapping each value to a value in a stored random permutation of all of the possible values for that value:

$Eq_x = \text{Map}(q_x, P_x)$ $Eq_y = \text{Map}(q_y, P_y)$ $Eq_\beta = \text{Map}(q_\beta, P_\beta)$ \quad (14)

where $P_x$, $P_y$, and $P_\beta$ are predetermined random permutations that are specific to the current finger and context.

Referring back to FIG. 4, the associated minutia sets 416 and contextualized relationship sets 420 are passed to the template construction subprocess 422, which constructs the template 424 to represent the fingerprint sample 306 in the template discrimination subprocess 318. The resulting template 424 varies in structure depending upon whether the relationship contextualization subprocess 418 was forgone and whether the template 424 generated is a reference template 310 or a query template 316.

In one implementation, the template construction is performed as follows: When the relationship contextualization subprocess 418 is forgone, then the template 424 is constructed of rows including i j $d_{ij}$ $\alpha_{ij}$ $\beta_{ij}$ where i and j are minutia indexes. j is a member of the set of minutiae associated with i. ($d_{ij}$, $\alpha_{ij}$, $\beta_{ij}$) are the relationships (d, $\alpha$, $\beta$) between i and j.

When the template 424 is to be a reference template 310 that utilizes the process 500 described previously herein. The template 324 is constructed of rows including i j $EX_{ij}$ $EY_{ij}$ $EB_{ij}$ where i and j are minutia indexes. j is a member of the set of minutiae associated with i. ($EX_{ij}$, $EY_{ij}$, $EB_{ij}$) are the encrypted ranges (EX, EY, EB) for i and j.

When the template 424 is to be a query template 316 that is determined using the contextualization process 400 described previously herein, then the template 424 is constructed of rows including:

i j $Ex_{ij}$ $EY_{ij}$ $E\beta_{ij}$ where i and j are minutia Indexes. j is a member of the set of minutiae associated with i. ($Ex_{ij}$, $Ey_{ij}$, $E\beta_{ij}$) is the encrypted (Ex, Ey, E$\beta$) triplet for i and j.

When the template 424 is generated by the enrollment process 302 (i.e., a reference template 310) that is using the process 500 described previously herein, the template 424 is constructed of rows including:

i j $EQ_{x_{ij}}$ $r_{x_{ij}}$ $EQ_{y_{ij}}$ $r_{y_{ij}}$ $EQ_{\beta_{ij}}$ $r_{\beta_{ij}}$ where i and j are minutia indexes, j is a member of the set of minutiae associated with i. ($EQ_{x_{ij}}$, $EQ_{y_{ij}}$, $EQ_{\beta_{ij}}$) are the ranges ($Q_x$, $Q_y$, $Q_\beta$) for i and j. ($r_{x_{ij}}$, $r_{y_{ij}}$, $r_{\beta_{ij}}$) are the values ($r_x$, $r_y$, $r_\beta$) for i and j.

When the template 424 is generated by the authentication process 304 that uses the process 600 described previously herein is then the template 424 is constructed of rows including:

i j $Eq_{x_{ij}}$ $r_{x_{ij}}$ $Eq_{y_{ij}}$ $r_{y_{ij}}$ $Eq_{\beta_{ij}}$ $r_{\beta_{ij}}$ where i and j are minutia indexes. j is a member of the set of minutiae associated with i. ($Eq_{x_{ij}}$, $Eq_{y_{ij}}$, $Eq_{\beta_{ij}}$) are the values ($Eq_x$, $Eq_y$, $Eq_\beta$) for i and j. ($r_{x_{ij}}$, $r_{y_{ij}}$, $r_{\beta_{ij}}$) are the values ($r_x$, $r_y$, $r_\beta$) for i and j.

FIG. 7 is a flow diagram of an example operational flow for the template discrimination process 318 according to one example. For the reference template 314, rows that share the same i form "neighborhood" i with each such "neighbor" row being known by its j. A row can therefore be uniquely referenced by its i and j. The query template 316 has "neighborhoods" with "neighbors" in the same fashion.

The reference template 314 and query template 316 are passed to the neighbor similarity determination subprocess 702, which calculates a neighbor similarity score (NSS) for each possible pair of neighbors for each possible pair of neighborhoods where a pair consists of a member from the reference template 314 and a member from the query template 316. For distinction, the i values of neighborhoods in the reference template 314 and query template 316 are labeled R and Q, respectively. Similarly, the j values of the neighbors in the reference template 314 and query template 316 are labeled r and q, respectively. The calculation of the NSS of neighbors r and q of neighborhoods R and Q, which varies based upon whether the relationship contextualization subprocess 418 is skipped in the template generation subprocess 302, is performed as follows:

If the relationship contextualization subprocess 418 is skipped in the template $$NSS = \begin{cases} 0, & |\Delta\beta| > T_\beta \text{ or } \Delta s > T_s \\ e^{-4.5\left(\frac{\Delta s}{T_s}\right)^2}, & \text{otherwise} \end{cases} \quad (15)$$

where $\Delta s = \sqrt{d_{Qq}^2 + d_{Rr}^2 - 2d_{Qq}d_{Rr}\cos(\alpha_{Qq}-\alpha_{Rr})}$, $|\Delta\beta| = |((\beta_{Qq}-P_{Rr}+180) \mod 360)-180|$, and $T_s$ and $T_\beta$ are predetermined values for threshold that are the same for every finger and context.

If process 500 is used in producing the two templates:

$$NSS = \begin{cases} 0, & I_x = \infty \text{ or } I_y = \infty \text{ or } I_\beta = \infty \text{ or } \\ & |\Delta\beta| > T_\beta \text{ or } \Delta s > T_s \\ e^{-4.5\left(\frac{\Delta s}{T_s}\right)^2}, & \text{otherwise} \end{cases} \quad (16)$$

where $\Delta s = \sqrt{(I_x - T_s)^2 + (I_y - T_s)^2}$, $|\Delta\beta| = |I_\beta - T_\beta|$, and $I_x$, $I_y$, $I_\beta$ are the indexes of where $EX_{Qq}$, $Ey_{Qq}$, $E\beta_{Qq}$ are found in $EX_{Rr}$, $EY_{Rr}$, $EB_{Rr}$ starting from 0, with the indexes of any unfound values being assigned $\infty$. $T_s$ and $T_\beta$ are the same predetermined integral values for threshold that are used during the relationship contextualization subprocess 418.

If process 600 is used in producing the two templates:

$$NSS = \begin{cases} 0, & I_x = \infty \text{ or } I_y = \infty \text{ or } I_\beta = \infty \text{ or } \\ & |\Delta\beta| > T_\beta \text{ or } \Delta s > T_s \\ e^{-4.5\left(\frac{\Delta s}{T_s}\right)^2}, & \text{otherwise} \end{cases} \quad (17)$$

where $$\Delta s = \sqrt{\left(r_{x_{Qq}} + (1 - 2(I_x \mod 2))r_{x_{Rr}} - 2\left\lfloor\frac{I_x}{2}\right\rfloor T_s\right)^2 + \left(r_{y_{Qq}} + (1 - 2(I_y \mod 2))r_{y_{Rr}} - 2\left\lfloor\frac{I_y}{2}\right\rfloor T_s\right)^2},$$

$$|\Delta\beta| = \left|r_{\beta_{Qq}} + (1 - 2(I_\beta \mod 2))r_{\beta_{Rr}} - 2\left\lfloor\frac{I_\beta}{2}\right\rfloor T_\beta\right|,$$

and $I_x$, $I_y$, $I_\beta$ are the indexes of where $Eq_{x_{Qq}}$, $Eq_{y_{Qq}}$, $Eq_{\beta_{Qq}}$ are found in $EQ_{x_{Rr}}$, $EQ_{y_{Rr}}$, $EQ_{\beta_{Rr}}$, starting at 0, with the indexes of any unfound value being assigned $\infty$. $T_s$ and $T_\beta$ are the same predetermined integral values for threshold that are used during the relationship contextualization process 418 in the template generation process 400.

The neighbor similarity scores 704 of each possible pair of neighbors for each possible pair of neighborhoods are passed to a neighbor pair selection subprocess 706, which identifies for each possible pair of neighborhoods neighbor pairs (NPs) 708 with the highest NSSs from every possible pair of neighbors for the pair of neighborhoods such that each neighbor only belongs to a single NP and a pair consists of a member from the reference template 314 and a member from the query template 316. A $NP_{rq}$ associates neighbor r of some neighborhood of the reference template 314 with neighbor q of some neighborhood of the query template 316.

The neighbor pairs 708 and their neighbor similarity scores 704 for each possible pair of neighborhoods are passed to a neighborhood similarity determination subprocess 710, which calculates a neighborhood similarity score (NHSS) for each possible pair of neighborhoods where a pair includes a member from the reference template 314 and a member from the query template 316. For distinction, the i values of neighborhoods in the reference template 314 and query template 316 are labeled R and Q, respectively. The calculation of the NHISS of neighborhoods R and Q may be implemented as follows:

$$\text{NHSS} = \Sigma \text{NSSs of the NPs of } R \text{ and } Q. \quad (18)$$

Neighborhood similarity scores 712 of each possible pair of neighborhoods are passed to a neighborhood pair selection subprocess 714, which selects the neighborhood pairs (NHPs) 716 with the highest NHSSs from every possible pair of neighborhoods such that each neighborhood only belongs to a single NHP and a pair consists of a member from the reference template 314 and a member from the query template 316. A $NHP_{RQ}$ associates neighborhood R of the reference template 314 with neighborhood Q of the query template 316.

The neighborhood pairs 716 and their neighbor pairs 708 are passed to an inconsistent neighbor elimination subprocess 718, which eliminates any $NP_{rq}$ of any $NHP_{RQ}$ if there is no $NHP_{rq}$ or no $NP_{RQ}$ of $NHP_{rq}$ where the i values of neighborhoods in the reference template 314 and query template 316 are labeled R and Q, respectively, and the j values of the neighbors in the reference template 314 and query template 316 are labeled r and q, respectively.

The neighborhood pairs 716 and their remaining neighbor pairs 708 are passed to a cluster identification subprocess 720, which identifies clusters 722 of the neighborhood pairs 716. Each cluster, being initially an empty set, is identified by first including any NHP that is not already a member of another cluster and then continually including all non-member NHPs that neighbor members until no new members are included where $NHP_{rq}$ and $NHP_{RQ}$ neighbor each other if $NHP_{RQ}$ has a $NP_{rq}$ and $NHP_{rq}$ has a $NP_{RQ}$. Every NHP may be a member of one and only one cluster.

The clusters 722 and the corresponding neighborhood pairs 716 are passed to an inconsistent neighborhood elimination subprocess 724, which eliminates any NHP if it is a member of a cluster with fewer members than a predetermined integral value for threshold $T_{cs}$.

The remaining pairs of the neighbor pairs 708 and the neighbor similarity scores 704 of the remaining neighborhood pairs 716 and the neighbor pairs 708 are passed to a neighborhood similarity review subprocess 726, which calculates the neighborhood similarity score for each remaining neighborhood pair 716. The NHSS of $NHP_{RQ}$ may be calculated using:

$$\text{NHSS} = \Sigma \text{NSSs of the remaining NPs of } NHP_{RQ} \quad (19)$$

The recalculated neighborhood similarity scores 712 of the remaining neighborhood pairs 716 are passed to a fingerprint similarity determination subprocess 728, which calculates the discrimination Score (DS) 320 for the reference template 314 and the query template 316. The DS may be calculated using:

$$DS = A^{\frac{\Sigma \text{recalculated NHSSs of the remaining NHPs}}{m+n}} \quad (20)$$

where m is the number of neighborhoods in the reference template 314 and n is the number of neighborhoods in the query template 316. In one implementation, constant may be equal to one or two.

Each of the processes described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

FIG. 12 is a schematic that shows relationships (d, $\alpha$, $\beta$) between a pair of minutiae according to one example. For any two minutiae with indices i and j in the fingerprint sample, a relationship can be formed as described previously herein that includes the Euclidean distance $d_{ij}$ between them and two invariant angles $\alpha_{ij}$ and $\beta_{ij}$.

$$d_{ij}=(\Delta x^2+\Delta y^2)^{1/2} \quad (21)$$

$$\alpha_{ij}=\varphi-\theta_i \quad (22)$$

$$\beta_{ij}=\varphi+180-\theta_j \quad (23)$$

$$\Delta x=x_j-x_i \quad (24)$$

$$\Delta y=y_j-y_i \quad (25)$$

$$\varphi=\tan^{-1}(\Delta y/\Delta x) \quad (26)$$

Figure 13A:
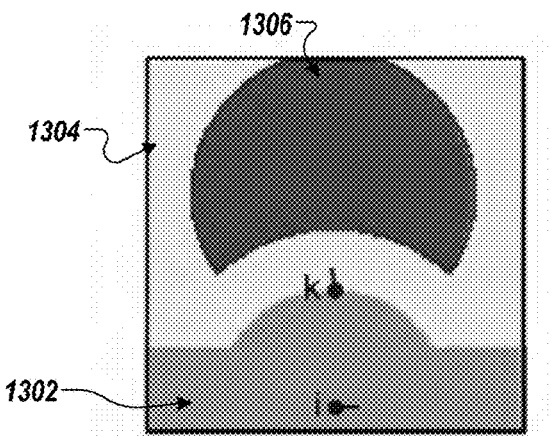
FIG. 13A is a schematic that illustrates neighbor-selection according to one example.

FIG. 13A is a schematic that shows neighbor-selection using equation (2) when considering whether minutia j (not shown) is a neighbor minutia i in various locations proximate to i and another minutia k. If j appears in region 1302, j is a neighbor of i if F≥1.00. If j appears in region 1304, j is a neighbor of i if F=1.49. If j appears in region 1306, j is not a neighbor of i if F≤1.49.

Figure 13B:
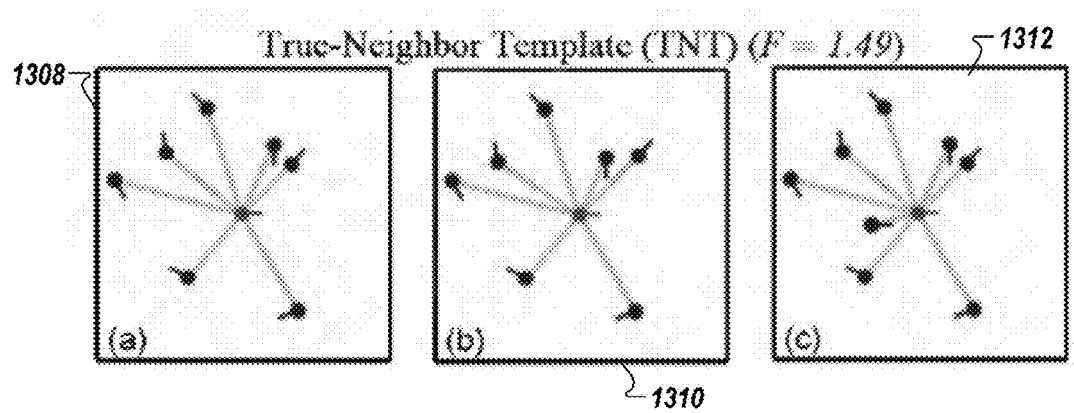
FIG. 13B is a schematic that shows neighbor-selection results according to one example.

FIG. 13B is a schematic that shows neighbor selection using the methodology described herein. Schematic 1308 shows the original neighborhood. Schematic 1310 shows the inclusion of correct neighbors despite relative distortion. Schematic 1312 shows inclusion of correct neighbors despite spurious minutia. The template generation process described herein is mostly unaffected by relative distortion and spurious minutiae, resulting in robust representation-consistency.

Figure 13C:
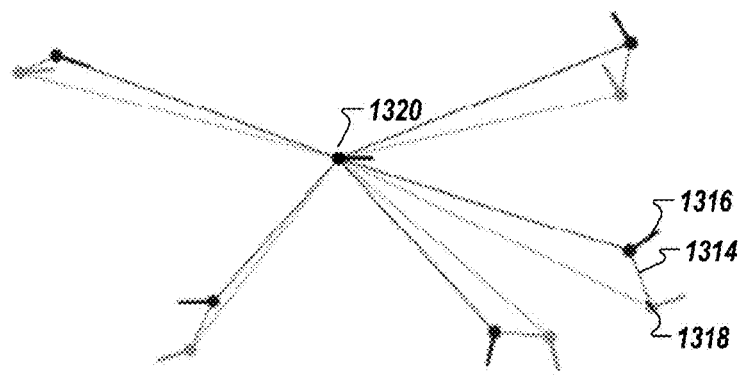
FIG. 13C is a schematic that shows two overlaid neighborhoods according to one example.

FIG. 13C is a schematic that shows correlation of $\Delta$s 1314 to selected neighbor pairs. Minutiae 1316 and minutiae 1318 from the two overlaid neighborhoods are automatically aligned to the central minutiae 1320 due to the encoding of both neighbor sets being relative to the central minutiae 1320.

To illustrate the capabilities of the systems and methodologies described herein, exemplary results are presented. True-Neighbor Template (TNT) refers to the method described previously herein using equation (2). Durable TNT (DTNT) refers to the method described herein using process 500.

A standard benchmark experiment was conducted using a first protocol FVC2006 described in R. Cappelli, M. Ferrara, A. Franco, and D. Maltoni, "Fingerprint verification competition 2006," Biometric Technology Today, vol. 15, pp. 7-9, 2007 and a second protocol FVC2002 described in D. Maio, D. Maltoni, R. Cappelli, J. L. Wayman, and A. K. Jain, "FVC2002: Second fingerprint verification competition," in Pattern recognition, 2002, Proceedings, 16th international conference on, 2002, pp. 811-814 and fingerprint databases—incorporated herein by reference. The first database of FVC2006 is omitted from the benchmark described herein due to the low resolution of its fingerprint images. Each FVC2006 database contains 12 samples per finger of 140 fingers. Each FVC2002 database contains 8 samples per finger of 100 fingers. The VeriFinger SDK tool is used to extract minutia locations and directions. The benchmarked parameters listed in Table 1 are used for all fingerprint databases per the FVC2006 and FVC2002 protocols, false rejection rates (FRRs) are determined by calculating match scores for all non-repeated pairs of all fingerprints from the same finger, applying a decision threshold below which false rejections are counted, and dividing by the total number of trials (9240 for FVC2006 and 2800 for FVC2002). Similarly, false acceptance rates (FARs) are determined by calculating match scores for all non-repeated pairs of the first fingerprint samples from all fingers, applying a decision threshold at or above which false acceptances are counted, and dividing by the total number of trials (9730 for FVC2006 and 4950 for FVC2002). The first segment of the experiment is designed to evaluate the consistency of neighbor-selection of TNT against several established approaches, including: fixed radius, k-nearest neighbors, fixed sectors, and Voronoi diagram. The neighbor-selection approaches are implemented for this experiment and utilize the TNT template format and matching process. The second segment of the experiment is designed to evaluate the authentication performance of TNT against several well-known approaches, including: Bozorth, K-plet, and Minutia cylinder-code (MCC) described in D. Maio, D. Maltoni, R. Cappelli, J. L. Wayman, and A. K. Jain, "FVC2002: Second fingerprint verification competition," in Pattern recognition, 2002. Proceedings, 16th international conference on, 2002, pp. 811-814, S. Chikkerur, A. N. Cartwright, and V. Govindaraju, "Kplet and coupled BFS: a graph based fingerprint representation and matching algorithm," in Advances in biometrics: Springer, 2005, pp. 309-315, R. Cappelli, M. Ferrara, and D. Maltoni, "Minutia cylindercode: A new representation and matching technique for fingerprint recognition," Pattern Analysis and Machine Intelligence, IEEE Transactions on, vol. 32, pp. 2128-2141, December 2010—each incorporated herein by reference.

For the first segment of the experiment, Table 2 shows the FRRs for a FAR of 0. TNT demonstrated superior authentication performance across all of the fingerprint databases. Because all of these neighbor-selection approaches, including TNT, utilize the TNT template format and matching process with identical match parameters, it can be concluded that it is consistency of neighbor-selection that differentiated the approaches. For the second segment of the experiment, Table 3 shows the FRRs for a FAR of 0. TNT demonstrated superior authentication performance for all of the fingerprint databases except for FVC2002 database 4A where TNT and MCC performed equally.

TABLE 1

Benchmarked parameters

| Method | Generation Parameters | Match Parameters |
|---|---|---|
| TNT | F = 1.49 | $T_\theta = 90^l$, $T_\beta = 19^l$, $\sigma = 20/3$, $T_{cs} = 4$ |
| Fixed Radius | R = 90 | Same as TNT |
| K-Nearest Neighbors | K = 8 | |
| Fixed Sectors | S = 4, K = 8 | |
| Voronoi | None | |

TABLE 1-continued

Benchmarked parameters

| Method | Generation Parameters | Match Parameters |
|---|---|---|
| Bozorth | — | |
| K-plet | — | |
| MCC | — | |

TABLE 2

FRRs for $0_{FMR}$ for first experiment segment

| | FVC2006 | | | FVC2002 | | | |
|---|---|---|---|---|---|---|---|
| Method | 2A | 3A | 4A | 1A | 2A | 3A | 4A |
| Fixed Radius | 1.73 | 13.51 | 1.39 | 2.32 | 2.93 | 13.21 | 6.68 |
| K-Nearest Neighbors | 2.55 | 14.10 | 8.70 | 2.46 | 2.04 | 11.96 | 6.71 |
| Fixed Sectors | 1.60 | 11.67 | 9.51 | 1.21 | 1.57 | 10.57 | 4.61 |
| Voronoi | 2.08 | 13.69 | 8.82 | 1.54 | 1.86 | 10.61 | 4.07 |
| TnT | 1.33 | 11.26 | 4.65 | 0.96 | 1.07 | 6.89 | 2.79 |

TABLE 3

FRRs for $0_{FMR}$ for second experiment segment

| | FVC2006 | | | FVC2002 | | | |
|---|---|---|---|---|---|---|---|
| Method | 2A | 3A | 4A | 1A | 2A | 3A | 4A |
| Bozorth | 3.18 | 13.48 | 19.21 | 9.57 | 6.50 | 26.11 | 13.11 |
| K-plet | 3.26 | 92.48 | 14.45 | 2.5 | 2.82 | 79.71 | 82.18 |
| MCC | 1.76 | 12.12 | 6.90 | 1.14 | 1.21 | 9.64 | 2.79 |
| TNT | 1.33 | 11.26 | 4.65 | 0.96 | 1.07 | 6.89 | 2.79 |

In order to understand the advantages provided by the DTNT method described herein exemplary implementations are described. The primary benefit of DTNT from the standpoint of compromise is in providing time to people maintaining authentication systems and people victimized by compromise while limiting liability from loss. This time can take several forms, including time to defend and time to recover. It is taken from attackers by prolonging the time needed for their efforts, increasing the risks and challenges they face. Attacks need not be directly targeted at an authentication system to cause damage. An effective authentication system must be secure from both internal and external events. To compromise an authentication system implementing DTNT an attacker needs to acquire either a correct fingerprint and the encryption keys or the enrollment template from the server 210. Because the server 210 does not transmit the enrollment template for any reason during the authentication process, the enrollment template needs to be stolen either during the enrollment process or directly from the server 210. This is an instance of breaking through the back door to steal the keys for the front door. Once such a compromise is noticed, which is likely be immediately, every compromised enrollment template is instantly revoked and reissued later using different encryption keys. The compromised enrollment template in its current form is worthless towards compromise of this or any other authentication system implementing DTNT. To be of any value to an attacker, the stolen enrollment template may need to be heavily analyzed.

Due to the construction of an enrollment DTNT, E(Xg, kx), E(Yg, ky), and E(Bg, kβ) are respectively ordered according to $|\Delta x|$, $|\Delta y|$, and $|\Delta\beta|$. An attacker may attempt three separate brute-force attacks to obtain (Xg, Yg, Bg) and (kx, ky, kβ). Because none of the plaintext values in Xg, Yg, or Bg are known, for each range the attacker may repeatedly make a guess for both the plaintext value and the encryption key until a match is found for the encrypted value in the first column of the range. This alone does not confirm a compromise because many plaintext-key combinations can result in the same cipher text value. While the ranges of possible correct values for Xg, Yg, and Bg are limited, there are sufficiently-many possible correct values to greatly hinder an attacker, especially when compounded by the exceedingly-large number of possible encryption keys with which they can be paired. In order to confirm a compromise of a given range, the attacker may add and subtract one from the guessed plaintext value, encrypt the results, and compare them with the cipher texts found in the second and third columns of the range. Even if they match, the attacker has no way of knowing if the order of the two underlying plaintext values matches the order of the two guessed plaintext values because each pair of columns past the first column in every neighbor row is randomly permuted during the generation process as described previously herein. The attacker can further proceed to confirm each additional pair of columns in similar fashion with similar uncertainty. A lengthy set of matches can provide some confirmation that the guessed plaintext values and encryption key are in fact correct. This process can require a significant amount of time and computing power to compromise the underlying information of even a single enrollment template. Even if such an attack is successful, the compromised ranges and encryption keys can be worthless against a different authentication system implementing DTNT because the attacker cannot possess the encryption keys for that system. An attempted brute-force attack of those encryption keys through repeated authentication attempts on that system using the compromised ranges can be halted by the system after a limited number of failed attempts, making such an attack statistically useless. The same situation can result if the attacker obtained the correct fingerprint somehow. An attacker can try to compromise the device containing the encryption keys. Compromising the device containing the encryption keys can require identifying the particular device or its owner, which can be very difficult, such as in the case of a smart phone. A local compromise accomplished by tracking down the device's owner and gaining access to the device can be particularly risky and challenging. Even if the device is found or stolen, an attacker may need to obtain the correct fingerprint, which prove difficult in a reasonable span of time unless the attacker knew exactly where and how to acquire it. This gives time to allow remote locking or wiping of the device, rendering the stolen encryption keys practically inaccessible. Additionally, the entities maintaining the authentication systems associated with the stolen encryption keys can be informed to revoke the associated enrollment templates, rendering the stolen encryption keys useless. Applying a simple, password-based encryption scheme to the take time to attack the encryption on the encryption keys, which likely already be revoked by the time such an attack is successful. In the event that an attacker acquires the correct fingerprint and the encryption keys, all associated enrollment templates can be revoked and reissued using different encryption keys. If an attacker somehow acquires an authentication template during its brief existence, as it is never stored, the attacker is unable to analyze the stolen authentication template in any of the previously described manners and therefore is unable to compromise the underlying ranges and encryption keys. Handling of this situation requires detection of the compromise along with revocation and reissue of the associated enrollment template using different encryption keys. In all of these scenarios, DTNT provides the perpetual use of fingerprints for authentication, even in the face of compromise, which proves that the DTNT approach is durable.

Next, a standard benchmark experiment for the DTNT method is described. The standard benchmark experiment is conducted using the FVC2006 and FVC2002 protocols and fingerprint databases. The first database of FVC2006 is omitted from the benchmark due to the low resolution of its fingerprint images. Each FVC2006 database contains 12 samples per finger of 140 fingers. Each FVC2002 database contains 8 samples per finger of 100 fingers. The VeriFinger SDK is used to extract minutia locations and directions. The benchmarked parameters listed in Table 4 are used for all fingerprint databases. The experiment consisted of two segments. For the first segment of the experiment, per the FVC2006 and FVC2002 protocols, FRRs are determined by calculating match scores for all non-repeated pairs of all fingerprints from the same finger, applying a decision threshold below which false rejections are counted, and dividing by the total number of trials (9240 for FVC2006 and 2800 for FVC2002). Similarly, FARs are determined by calculating match scores for all non-repeated pairs of the first fingerprint samples from all fingers, applying a decision threshold at or above which false acceptances are counted, and dividing by the total number of trials (9730 for FVC2006 and 4950 for FVC2002). For the second segment of the experiment, FRRs are determined by calculating match scores for all non-repeated pairs of the first two fingerprints from the same finger, applying a decision threshold below which false rejections are counted, and dividing by the total number of trials (140 for FVC2006 and 100 for FVC2002). Similarly, FARs are determined by calculating match scores for all non-repeated pairs of the first fingerprint samples from all fingers, applying a decision threshold at or above which false acceptances are counted, and dividing by the total number of trials (9730 for FVC2006 and 4950 for FVC2002). Both segments of the experiment are designed to evaluate the authentication performance of DTNT against TNT as well as several well-known approaches, including: MCC, PMCC described in Ferrara, M., Maltoni, D., Cappelli, R.: Noninvertible minutia cylinder-code representation, IEEE Transactions on Information Forensics and Security 7, 1727-1737, and 2PMCC described in Ferrara, M., Maltoni, D., Cappelli, R.: A two-factor protection scheme for MCC fingerprint templates, In: 2014 International Conference of the Biometrics Special Interest Group (BIOSIG), pp. 1-8, IEEE (2014).

For DTNT and 2PMCC, the same keys are used for all trials to allow for fair comparison with TNT, MCC, and PMCC. For PMCCk and 2PMCCk,c, only PMCC128 and 2PMCC64,64 are referenced in the discussion herein because they demonstrated superior authentication performance amongst all parameter configurations for PMCC and 2PMCC. For the first segment of the experiment, Table 5 shows the FRRs for a FAR of 0. Lower FRR indicates superior authentication performance. DTNT demonstrated comparable authentication performance across all of the fingerprint databases with respect to TNT with the exception of FVC2006 4A, which is composed of artificial fingerprints. DTNT demonstrated superior authentication performance across all of the fingerprint databases with respect to PMCC128 and 2PMCC64,64.

TABLE 4

Benchmarked parameters

| Method | Generation Parameters | Match Parameters |
|---|---|---|
| TNT | F = 1.49 | $T_\theta = 90^l$, $T_\beta = 19^l$, $\sigma = 20/3$, $T_{cs} = 4$ |
| Fixed Radius | R = 90 | Same as TNT |
| K-Nearest Neighbors | K = 8 | |
| Fixed Sectors | S = 4, K = 8 | |
| Voronoi | None | |
| Bozorth | — | |
| K-plet | — | |
| MCC | — | |

TABLE 5

FRRs for $0_{FMR}$ for first experiment segment

| | FVC2006 | | | FVC2002 | | | |
|---|---|---|---|---|---|---|---|
| Method | 2A | 3A | 4A | 1A | 2A | 3A | 4A |
| $MCC_{16b}$ | 1.76 | 12.12 | 6.90 | 1.14 | 1.21 | 9.64 | 2.79 |
| $PMCC_{16}$ | 30.31 | 73.55 | 87.52 | 53.89 | 52.75 | 79.11 | 77.96 |
| $PMCC_{32}$ | 14.83 | 39.47 | 60.12 | 19.11 | 14.71 | 60.29 | 44.36 |
| $PMCC_{64}$ | 8.35 | 27.59 | 31.24 | 6.14 | 5.36 | 38.82 | 15.64 |
| $PMCC_{128}$ | 4.70 | 17.06 | 24.46 | 3.00 | 3.14 | 29.36 | 9.43 |
| $2PMCC_{32,24}$ | 16.85 | 54.37 | 83.46 | 25.25 | 19.93 | 58.71 | 60.82 |
| $2PMCC_{32,32}$ | 14.83 | 39.42 | 60.38 | 19.14 | 14.54 | 60.21 | 44.32 |
| $2PMCC_{64,48}$ | 11.04 | 29.07 | 41.56 | 7.29 | 7.36 | 47.68 | 21.64 |
| $2PMCC_{64,64}$ | 8.35 | 27.59 | 31.18 | 6.14 | 5.29 | 38.79 | 15.57 |
| TNT | 1.33 | 11.26 | 4.65 | 0.96 | 1.07 | 6.89 | 2.79 |
| DTNT | 1.28 | 9.82 | 8.02 | 1.14 | 1.07 | 7.46 | 3.32 |

TABLE 6

FRRs for $0_{FMR}$ for second experiment segment

| | FVC2006 | | | FVC2002 | | | |
|---|---|---|---|---|---|---|---|
| Method | 2A | 3 A | 4A | 1A | 2A | 3A | 4A |
| $MCC_{16b}$ | 3.57 | 19.29 | 5.00 | 0.00 | 0.00 | 6.00 | 3.00 |
| $PMCC_{16}$ | 37.86 | 82.86 | 82.86 | 23.00 | 26.00 | 57.00 | 71.00 |
| $PMCC_{32}$ | 20.00 | 52.14 | 57.14 | 3.00 | 2.00 | 36.00 | 49.00 |
| $PMCC_{64}$ | 12.86 | 38.57 | 25.71 | 0.00 | 1.00 | 23.00 | 14.00 |
| $PMCC_{128}$ | 7.86 | 27.14 | 19.29 | 0.00 | 0.00 | 20.00 | 12.00 |
| $2PMCC_{32,24}$ | 19.29 | 61.43 | 79.29 | 6.00 | 5.00 | 37.00 | 56.00 |
| $2PMCC_{32,32}$ | 20.00 | 52.14 | 57.14 | 3.00 | 2.00 | 36.00 | 49.00 |
| $2PMCC_{64,48}$ | 16.43 | 39.29 | 40.00 | 0.00 | 1.00 | 30.00 | 23.00 |
| $2PMCC_{64,64}$ | 12.86 | 38.57 | 25.71 | 0.00 | 1.00 | 23.00 | 14.00 |
| TNT | 2.14 | 19.29 | 5.00 | 0.00 | 0.00 | 4.00 | 2.00 |
| DTNT | 2.86 | 17.14 | 5.71 | 0.00 | 0.00 | 4.00 | 3.00 |

Figure 14:
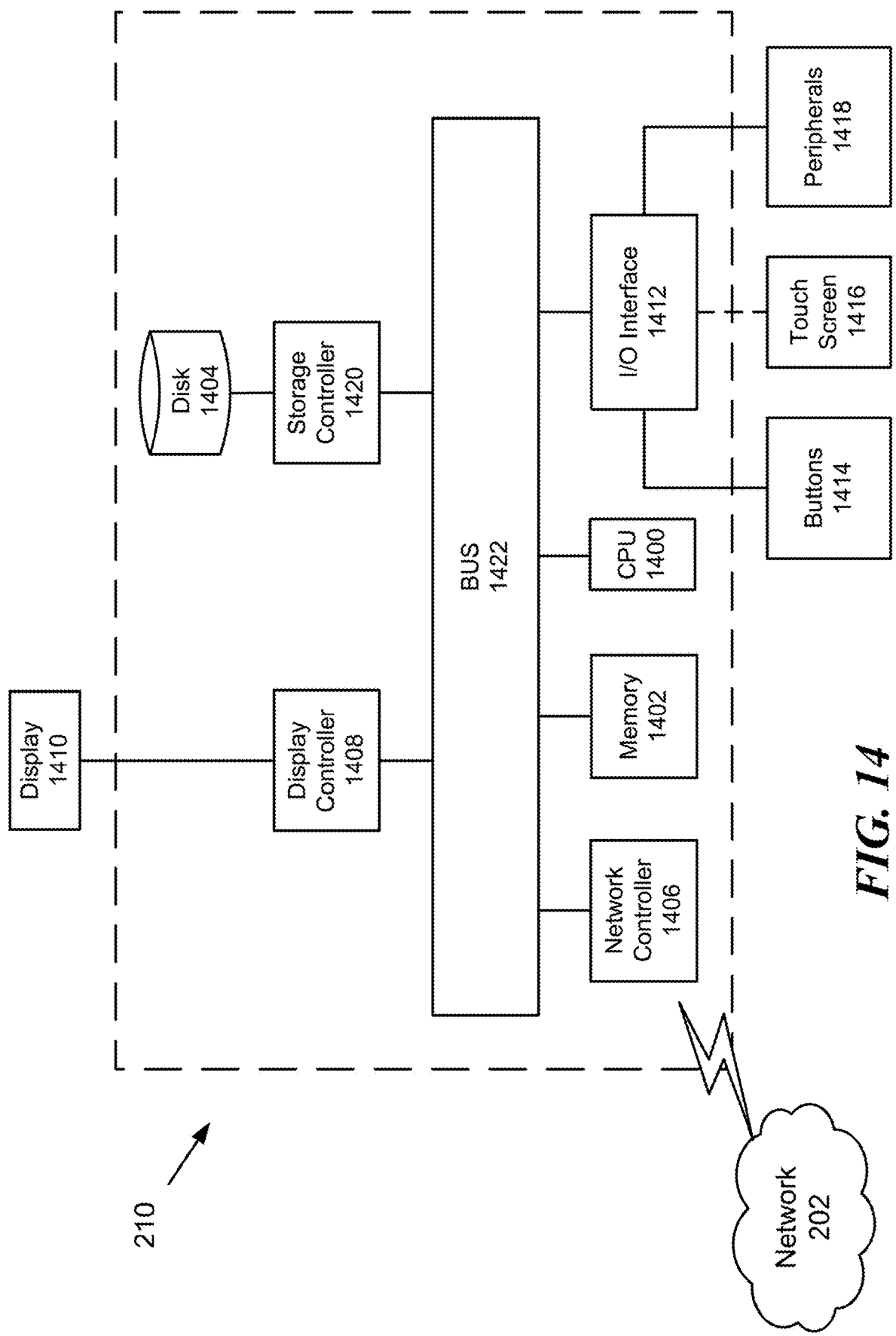
FIG. 14 is an exemplary block diagram of a server according to one example.

Next, a hardware description of the server 210 according to exemplary embodiments is described with reference to FIG. 14. In FIG. 14, the server 210 includes a CPU 1400 which performs the processes described herein. The process data and instructions may be stored in memory 1402. These processes and instructions may also be stored on a storage medium disk 1404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 210 communicates, such as the electronic device 206, a server, or a computer.

Further, the claimed advancements may be provided as a utility application, background daemon, or component of an operating system, or combination thereof, executing in conjunction with CPU 1400 and an operating system such as Microsoft® Windows®, UNIX®, Oracle® Solaris, LINUX®, Apple macOS® and other systems known to those skilled in the art.

In order to achieve the server 210, the hardware elements may be realized by various circuitry elements, known to those skilled in the art. For example, CPU 1400 may be a Xenon® or Core® processor from Intel Corporation of America or an Opteron® processor from AMD of America, or may be other processor types that would be recognized by one of ordinary skill in the art. Alternatively, the CPU 1400 may be implemented on an FPGA, ASIC, PLD or using discrete logic circuits, as one of ordinary skill in the art would recognize. Further, CPU 1400 may be implemented as multiple processors cooperatively working in parallel to perform the instructions of the inventive processes described above.

The server 210 in FIG. 14 also includes a network controller 1406, such as an Intel Ethernet PRO network interface card from Intel Corporation of America, for interfacing with network 202. As can be appreciated, the network 202 can be a public network, such as the Internet, or a private network such as LAN or WAN network, or any combination thereof and can also include PSTN or ISDN sub-networks. The network 202 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The server 210 further includes a display controller 1408, such as a NVIDIA® GeForce® GTX or Quadro® graphics adaptor from NVIDIA Corporation of America for interfacing with display 1410, such as a Hewlett Packard® HPL2445w LCD monitor. A general purpose I/O interface 1412 interfaces with a keyboard and/or mouse 1414 as well as an optional touch screen panel 1416 on or separate from display 1410. General purpose I/O interface also connects to a variety of peripherals 1418 including printers and scanners, such as an OfficeJet® or DeskJet® from Hewlett Packard®.

The general purpose storage controller 1420 connects the storage medium disk 1404 with communication bus 1422, which may be an ISA, EISA, VESA, PCI, or similar, for interconnecting all of the components of the server 210. A description of the general features and functionality of the display 1410, keyboard and/or mouse 1414, as well as the display controller 1408, storage controller 1420, network controller 1406, and general purpose I/O interface 1412 is omitted herein for brevity as these features are known.

Figure 15:
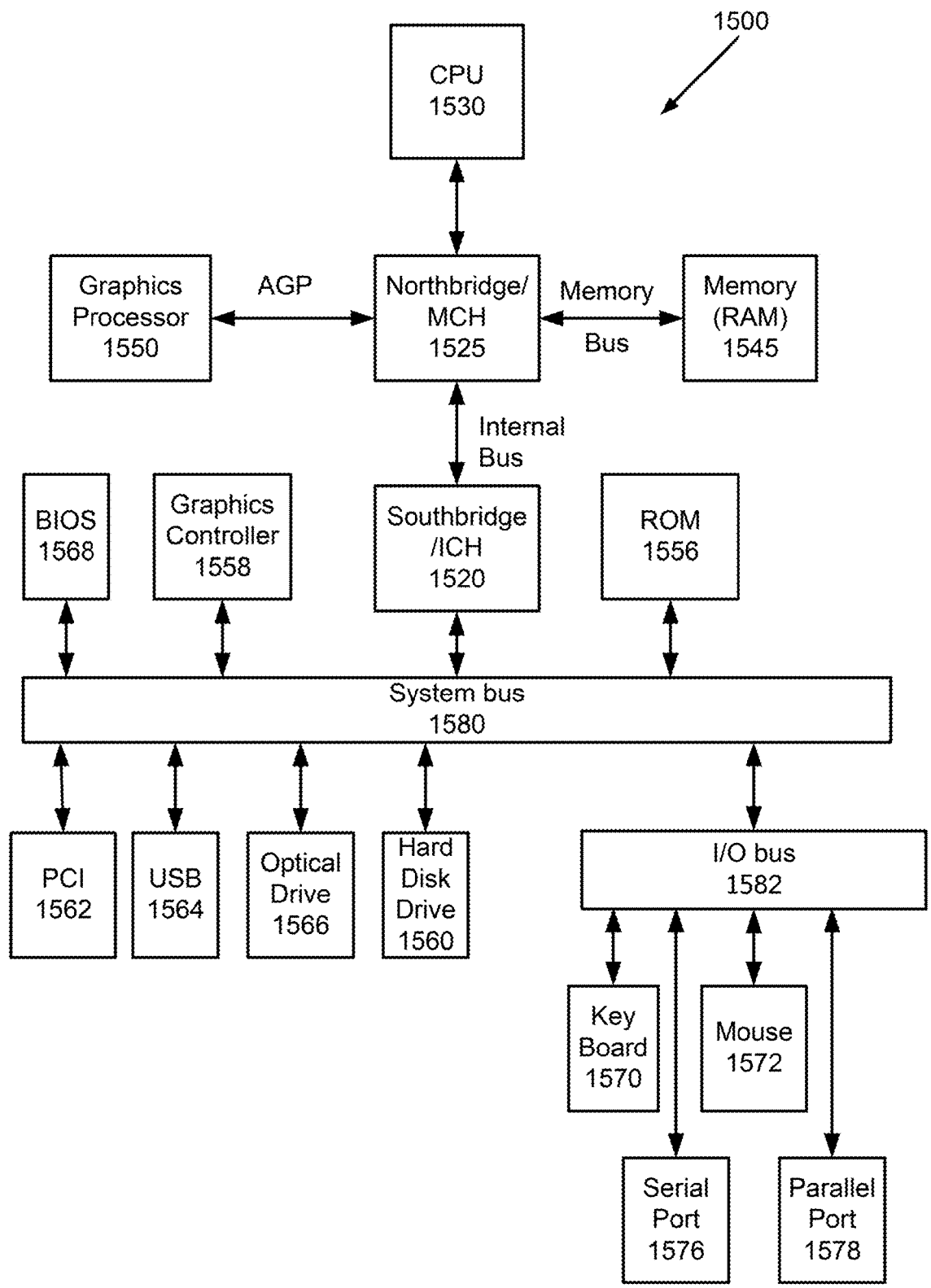
FIG. 15 is an exemplary block diagram of a data processing system according to one example.

FIG. 15 shows a schematic diagram of a data processing system, according to certain embodiments, for authentication utilizing the methodologies described herein. The data processing system is an example of a computer in which specific code or instructions implementing the processes of the illustrative embodiments may be located to create a particular machine for implementing the above-noted process.

Figure 16:
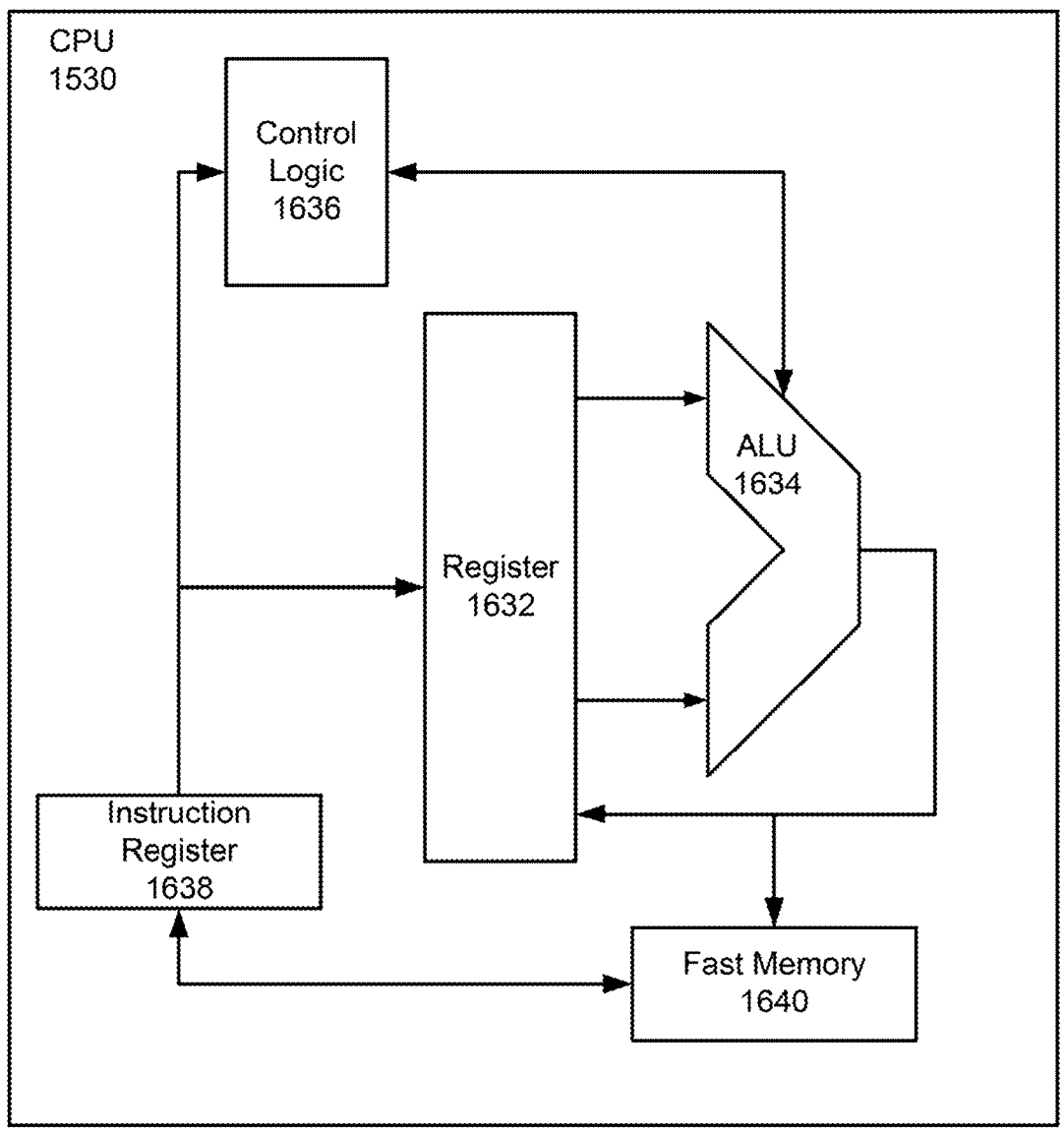
FIG. 16 is an exemplary block diagram of a central processing unit according to one example.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICHI 1520 via an internal bus (e.g., a unified media interface or a direct media interface). The CPU 1530 may contain one or more processors and may even be implemented using one or more heterogeneous processor systems. For example, FIG. 16 shows one implementation of CPU 1530.

Further, in the data processing system 1500 of FIG. 15, SB/ICH 1520 is coupled through a system bus 1580 to an I/O Bus 1582, a read only memory (ROM) 1556, an universal serial bus (USB) port 1564, a flash binary input/output system (BIOS) 1568, and a graphics controller 1558. In one implementation, the I/O bus can include a super I/O (SIO) device.

PCI/PCIe devices can also be coupled to SB/ICH 1520 through a PCI bus 1562. The PCI devices may include, for example, Ethernet adapters, add-in cards, and PC cards for notebook computers. Further, the hard disk drive (HDD) 1560 and optical drive 1566 can also be coupled to the SB/ICH 1520 through the system bus 1580. The Hard disk drive 1560 and the optical drive or CD-ROM 1566 can use, for example, an integrated drive electronics (IDE) or serial advanced technology attachment (SATA) interface.

In one implementation, a keyboard 1570, a mouse 1572, a serial port 1576, and a parallel port 1578 can be connected to the system bus 1580 through the I/O bus 1582. Other peripherals and devices that can be connected to the SB/ICH 1520 include a mass storage controller such as SATA or PATA (Parallel Advanced Technology Attachment), an Ethernet port, an ISA bus, a LPC bridge, SMBus, a DMA controller, and an Audio Codec (not shown).

In one implementation of CPU 1530, the instruction register 1638 retrieves instructions from the fast memory 1640. At least part of these instructions are fetched from the instruction register 1638 by the control logic 1636 and interpreted according to the instruction set architecture of the CPU 1630. Part of the instructions can also be directed to the register 1632. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 14 or 15, constitutes or includes specialized corresponding structure that is programmed or configured to perform the algorithms shown in FIGS. 3, 4, 5, 6 and 7.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The system and associated methodologies described herein provides an improvement to the technical fields of pattern representation and pattern recognition as well as biometrics, cryptography and data-security. The methods describe in part biometric (or other discriminating information) credentials that provide strong security and are also durable by being diversifiable and reissuable.

As more and more information is being digitally stored, data security is of increasing importance. Further, cyberattacks are a growing concern for companies and governments across the world as more and more data is open to attack. Thus, the system and method described herein provides a technical solution to the technical problem of enhancing confidentiality in authentication systems that use credentials based on biometric features. Further, the processing of data (e.g., permutation) cannot reasonably be performed by a human and effectively provide the advantageous features described herein. Thus, the system and associated methodology described herein is directed in some embodiments to one or more specially programmed computers that perform unique functions that are not merely generic. The system and associated methodology is therefore not directed to any abstract idea and further amounts to significantly more than an abstract idea based on the improvements and advantages described herein. Further, the system vastly improves upon the functionality of existing computer systems by providing enhanced extracting of minutia and identifying and filtering of clusters which result in faster processing speeds.

The invention claimed is:

1. A method for pattern representation and recognition, the method comprising:
acquiring, using processing circuitry of a server, a representation associated with discriminating information including a fingerprint sample associated with a subject;
retrieving, using the processing circuitry, an association between a stored representation and an identity of the subject;
determining a neighbor similarity score as a function of distances between two minutiae from two discriminating information representations based on a relationship with a common minutiae identified in the two minutiae;
determining, using the processing circuitry, a discrimination score as a function of the representation and the stored representation based on the neighbor similarity score and whether a contextualizing sub-process was performed on the stored representation, the contextualizing sub-process being performed when two or more operational contexts are used, the two or more operational contexts including different authentication systems or periods of time, the contextualizing sub-process modifying a representation of the fingerprint sample; and
executing, using the processing circuitry, one or more control actions based on the discrimination score.

2. The method of claim 1, wherein the one or more control actions include:
authenticating the representation of the subject in response to determining that the discrimination score is greater than a predetermined threshold.

3. The method of claim 1, further comprising:
eliminating an identified selected pairs of neighbor minutiae when paired neighbors do not mutually reciprocate a selection of an original pair as neighbors, each pair include minutiae from the two discriminating information representations.

4. The method of claim 3, further comprising:
identifying paired sets of minutiae included in the two discriminating information representations by generating a set with a minutia in one discriminating information representation that is not a member of a different set and adding all selected neighbors of all members.

* * * * *